US012300147B2

(12) United States Patent
Kim et al.

(10) Patent No.: US 12,300,147 B2
(45) Date of Patent: May 13, 2025

(54) DISPLAY DEVICE PERFORMING A DUMMY SCAN OPERATION

(71) Applicant: SAMSUNG DISPLAY CO., LTD., Yongin-si (KR)

(72) Inventors: Jung-Taek Kim, Yongin-si (KR); Hong-Kyu Kim, Yongin-si (KR); Seungho Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/483,959

(22) Filed: Oct. 10, 2023

(65) Prior Publication Data

US 2024/0312395 A1 Sep. 19, 2024

(30) Foreign Application Priority Data

Mar. 13, 2023 (KR) ........................ 10-2023-0032851

(51) Int. Cl.
*G09G 3/20* (2006.01)
*G09G 3/3233* (2016.01)
(Continued)

(52) U.S. Cl.
CPC ......... *G09G 3/2096* (2013.01); *G09G 3/2007* (2013.01); *G09G 3/3233* (2013.01); *G09G 3/36* (2013.01); *G09G 3/3266* (2013.01); *G09G 2300/0819* (2013.01); *G09G 2300/0842* (2013.01); *G09G 2320/0233* (2013.01); *G09G 2320/0247* (2013.01);
(Continued)

(58) Field of Classification Search
CPC .. G09G 3/2096; G09G 3/2007; G09G 3/3233; G09G 3/3266; G09G 3/36; G09G 2300/0819; G09G 2300/0842; G09G 2320/0233; G09G 2320/0247; G09G 2320/0295; G09G 2320/0626; G09G 2360/16
USPC .......................................................... 345/690
See application file for complete search history.

(56) References Cited

U.S. PATENT DOCUMENTS

2010/0118013 A1* 5/2010 Kitayama ............ G09G 3/3677 345/98
2012/0182405 A1* 7/2012 Huang ................. H04N 13/341 348/54

(Continued)

FOREIGN PATENT DOCUMENTS

KR 10-2022-0030495 3/2022

*Primary Examiner* — Tom V Sheng
(74) *Attorney, Agent, or Firm* — F. CHAU & ASSOCIATES, LLC

(57) ABSTRACT

A display device includes a data driver providing a data voltage to each of multiple pixels, a scan driver providing first and second scan signals to each of the pixels, and a controller to control the data driver and the scan driver. The scan driver performs a first active scan operation that sequentially provides the first and second scan signals to the pixels in an active period of a first frame period, and initiates a dummy scan operation that sequentially provides the second scan signal to the pixels in a blank period of the first frame period. When a second frame period starts before the dummy scan operation for the pixel in a last row, the data driver changes a level of the data voltage in an overlap period in which the dummy scan operation and a second active scan operation in the second frame period are simultaneously performed.

21 Claims, 18 Drawing Sheets

(51) Int. Cl.
*G09G 3/36* (2006.01)
*G09G 3/3266* (2016.01)

(52) U.S. Cl.
CPC ............... *G09G 2320/0295* (2013.01); *G09G 2320/0626* (2013.01); *G09G 2360/16* (2013.01)

(56) References Cited

U.S. PATENT DOCUMENTS

| | | | | |
|---|---|---|---|---|
| 2013/0278835 | A1* | 10/2013 | Kitayama ............ | G09G 3/3648<br>348/731 |
| 2022/0068194 | A1* | 3/2022 | Kim ......................... | G09G 3/32 |
| 2022/0084472 | A1* | 3/2022 | Kim ..................... | G09G 3/3266 |
| 2022/0101794 | A1* | 3/2022 | Kim ..................... | G09G 3/3266 |
| 2022/0358884 | A1* | 11/2022 | Chae .................... | G09G 3/3233 |
| 2023/0034225 | A1* | 2/2023 | Tanaka ................. | G09G 3/3241 |
| 2023/0096537 | A1* | 3/2023 | Lim ..................... | G09G 3/3233<br>345/212 |
| 2024/0013729 | A1* | 1/2024 | Kim ..................... | G09G 3/3266 |
| 2024/0221647 | A1* | 7/2024 | An ....................... | G09G 3/3233 |

* cited by examiner

DISPLAY DEVICE PERFORMING A DUMMY SCAN OPERATION

CROSS-REFERENCE TO RELATED APPLICATION(S)

This application claims priority under 35 USC § 119 to Korean Patent Application No. 10-2023-0032851, filed on Mar. 13, 2023, in the Korean Intellectual Property Office (KIPO), the contents of which is herein incorporated by reference in its entirety.

BACKGROUND

1. Field

Embodiments of the present inventive concept relate to a display device, and more particularly to a display device performing a dummy scan operation.

2. Description of the Related Art

A display device may display an image at a constant frame frequency (or a constant frame rate) of about 60 Hz, about 120 Hz, about 240 Hz, or at another frequency. However, the frame frequency of rendering by a host processor (e.g., a graphics processing unit (GPU), an application processor (AP) or a graphics card) providing frame data to the display device may be different from the frame frequency of the display device. For example, when the host processor provides the display device with frame data for a game image (gaming image) that requires complicated rendering, the frame frequency mismatch may be intensified. In this case, a tearing phenomenon may occur where a boundary line is caused by the frame frequency mismatch in an image of the display device.

To prevent or reduce the tearing phenomenon, a variable frame mode (e.g., Free-Sync, G-Sync, etc.) has been developed in which a host processor provides frame data to a display device at a variable frame frequency by changing a time (or a duration of time) of a blank period in each frame period. A display device supporting the variable frame mode may display an image in synchronization with the variable frame frequency, or may drive a display panel at the variable frame frequency or a variable driving frequency, thereby reducing or preventing the tearing phenomenon.

SUMMARY

Some embodiments described herein provide a display device capable of having uniform luminance when a display panel is driven at a variable frequency.

According to embodiments, there is provided a display device including a display panel including pixels, a data driver configured to provide a data voltage to each of the pixels, a scan driver configured to provide a first scan signal and a second scan signal to each of the pixels, and a controller configured to control the data driver and the scan driver. The scan driver performs a first active scan operation that sequentially provides the first scan signal and the second scan signal to the pixels on a row basis in an active period of a first frame period, and initiates a dummy scan operation that sequentially provides the second scan signal to the pixels on a row basis in a blank period of the first frame period. In a case where a second frame period starts before the dummy scan operation for the pixel in a last row is performed, the data driver changes a voltage level of the data voltage in an overlap period in which the dummy scan operation and a second active scan operation in the second frame period are simultaneously performed.

In embodiments, with respect to a same gray level, the voltage level of the data voltage in the overlap period may be higher than the voltage level of the data voltage in a non-overlap period in which only the second active scan operation is performed after the dummy scan operation is completed.

In embodiments, the display panel may be driven at a driving frequency that varies within a variable frequency range. The scan driver may initiate the dummy scan operation after a time corresponding to a blank period of a minimum frame period from a time point at which the first active scan operation is performed, and the minimum frame period may correspond to a maximum frequency of the variable frequency range.

In embodiments, each of the pixels may include a capacitor including a first electrode connected to a first node and a second electrode connected to a second node, a first transistor including a gate connected to the first node, a first terminal receiving a first power supply voltage, and a second terminal connected to the second node, a second transistor configured to transfer the data voltage to the first node in response to the first scan signal, a third transistor configured to transfer an initialization voltage to the second node in response to the second scan signal, and a light emitting element including an anode connected to the second node and a cathode receiving a second power supply voltage.

In embodiments, the pixels may include a first pixel that receives the data voltage in the overlap period, and a second pixel that receives the data voltage in a non-overlap period in which only the second active scan operation is performed after the dummy scan operation is completed. With respect to a same gray level, the voltage level of the data voltage applied to the first pixel may be higher than the voltage level of the data voltage applied to the second pixel, and a voltage difference between the first node and the second node in the first pixel may be substantially the same as a voltage difference between the first node and the second node in the second pixel.

In embodiments, the controller may include a refresh rate detector configured to detect a start time point of the active period and a start time point of the blank period, a scan controller configured to generate first and second scan control signals for sequentially providing the first and second scan signals to the pixels in the active period, and to generate the second scan control signal for sequentially providing the second scan signal to the pixels in the blank period, and a data controller configured to generate output image data by increasing input image data for overlapping pixel rows that receive the first and second scan signals in the overlap period among all pixel rows of the display panel.

In embodiments, the scan controller may generate a count value by counting receiving pixel rows that receive the second scan signal by the dummy scan operation until the second frame period starts. The controller may further include an overlap area detector configured to calculate a number of remaining pixel rows that are to receive the second scan signal by the dummy scan operation in the overlap period by subtracting a number of the receiving pixel rows from a number of the all pixel rows based on the count value. The data controller may determine the overlapping pixel rows based on the number of the remaining pixel rows, and may generate the output image data by increasing the input image data for the overlapping pixel rows.

In embodiments, the controller may further include an input-output lookup table configured to store a plurality of output gray levels corresponding to a plurality of input gray levels. With respect to the overlapping pixel rows, the data controller may obtain an output gray level corresponding to an input gray level represented by the input image data using the input-output lookup table, and may generate the output image data representing the obtained output gray level.

In embodiments, the controller may further include a first input-output lookup table configured to store a plurality of first output gray levels corresponding to a plurality of input gray levels, and a second input-output lookup table configured to store a plurality of second output gray levels corresponding to the plurality of input gray levels and different from the plurality of first output gray levels. The data controller may generate the output image data using the first input-output lookup table in a first driving mode in which a driving frequency of the display panel is changed within a first variable frequency range, and may generate the output image data using the second input-output lookup table in a second driving mode in which the driving frequency of the display panel is changed within a second variable frequency range different from the first variable frequency range.

In embodiments, the controller may further include an input-compensation lookup table configured to store a plurality of compensation gray levels corresponding to a plurality of input gray levels, and a compensation coefficient generator configured to generate a compensation coefficient that gradually decreases in the overlap period. With respect to the overlapping pixel rows, the data controller may obtain a compensation gray level corresponding to an input gray level represented by the input image data using the input-compensation lookup table, may multiply the compensation gray level by the compensation coefficient, may calculate an output gray level by adding the compensation gray level multiplied by the compensation coefficient to the input gray level represented by the input image data, and may generate the output image data representing the calculated output gray level.

According to embodiments, there is provided a display device including a display panel including pixels, a data driver configured to provide a data voltage to each of the pixels, a scan driver configured to provide a first scan signal and a second scan signal to each of the pixels, a power management circuit configured to provide an initialization voltage to the pixels, and a controller configured to control the data driver, the scan driver and the power management circuit. The scan driver performs a first active scan operation that sequentially provides the first scan signal and the second scan signal to the pixels on a row basis in an active period of a first frame period, and initiates a dummy scan operation that sequentially provides the second scan signal to the pixels on a row basis in a blank period of the first frame period. In a case where a second frame period starts before the dummy scan operation for the pixel in a last row is performed, the power management circuit changes a voltage level of the initialization voltage in an overlap period in which the dummy scan operation and a second active scan operation in the second frame period are simultaneously performed.

In embodiments, the voltage level of the initialization voltage in the overlap period may be lower than the voltage level of the initialization voltage in a non-overlap period after the dummy scan operation is completed.

In embodiments, the voltage level of the initialization voltage may be decreased at a start time point of the overlap period, and may be gradually increased to an original voltage level during the overlap period.

In embodiments, wherein a decrease amount of the voltage level of the initialization voltage at a start time point of the overlap period may be determined according to a time length of the overlap period.

In embodiments, in a case where the overlap period has a first time length, the voltage level of the initialization voltage may be decreased by a first decrease amount from an original voltage level at a start time point of the overlap period. In a case where the overlap period has a second time length shorter than the first time length, the voltage level of the initialization voltage may be decreased by a second decrease amount less than the first decrease amount from the original voltage level at the start time point of the overlap period.

In embodiments, the pixels may include a first pixel that receives the initialization voltage by the second active scan operation in the overlap period, and a second pixel that receives the initialization voltage by the second active scan operation in a non-overlap period after the dummy scan operation is completed. The voltage level of the initialization voltage applied to the first pixel in the overlap period may be lower than the voltage level of the initialization voltage applied to the second pixel in the non-overlap period, and, with respect to a same gray level, a gate-source voltage of a driving transistor of the first pixel may be substantially the same as a gate-source voltage of a driving transistor of the second pixel.

In embodiments, the controller may include a refresh rate detector configured to detect a start time point of the active period and a start time point of the blank period, a scan controller configured to generate first and second scan control signals for sequentially providing the first and second scan signals to the pixels in the active period, and to generate the second scan control signal for sequentially providing the second scan signal to the pixels in the blank period, and a power controller configured to control the power management circuit to decrease the voltage level of the initialization voltage in the overlap period.

In embodiments, the scan controller may generate a count value by counting receiving pixel rows that receive the second scan signal by the dummy scan operation until the second frame period starts. The controller may further include an overlap area detector configured to calculate a number of remaining pixel rows that are to receive the second scan signal by the dummy scan operation in the overlap period by subtracting a number of the receiving pixel rows from a number of all pixel rows based on the count value. The power controller may control the power management circuit to decrease the voltage level of the initialization voltage during the overlap period having a time length corresponding to the number of remaining pixel rows.

In embodiments, the power controller may control the power management circuit to decrease the voltage level of the initialization voltage by a decrease amount corresponding to the number of remaining pixel rows from an original voltage level at a start time point of the overlap period, and may control the power management circuit to gradually increase the voltage level of the initialization voltage to the original voltage level during the overlap period.

According to embodiments, there is provided a display device including a display panel including pixels, a data driver configured to provide a data voltage to each of the pixels, a scan driver configured to provide a first scan signal and a second scan signal to each of the pixels, a power management circuit configured to provide an initialization voltage to the pixels, and a controller configured to control the data driver, the scan driver and the power management circuit. When the first and second scan signals are applied to the pixels in a first row, and the second scan signal is applied to the pixels in a second row different from the first row, at least one of a voltage level of the data voltage and a voltage level of the initialization voltage is changed.

As described above, in a display device according to embodiments, a voltage level of a data voltage and/or a voltage level of an initialization voltage may be changed in an overlap period in which a dummy scan operation in a black period of a first frame period and an active scan operation in a second frame period are simultaneously performed. A pixel receiving the data voltage in the overlap period and a pixel receiving the data voltage in a non-overlap period after the overlap period may emit light with substantially the same luminance with respect to the same gray level, and a luminance difference (or deviation) between upper and lower regions of a display panel may be eliminated or reduced.

In accordance with one or more embodiments, a display device includes a scan driver coupled to a display panel; a data driver coupled to the display panel; and a controller configured to control the scan driver and the data driver to drive the display panel at a driving frequency that is substantially equal to a variable frame rate at which image data is rendered by a host processor.

The controller may be configured to control the scan driver to perform an active scan operation during an active period of a first frame period and to control the scan driver to perform one or more dummy scan operations during a blank period of the first frame period.'

The controller may be configured to control the scan driver to perform an active scan operation during a second frame period, the first frame period may correspond to a first frame rate at which the image data is rendered by the host processor, and the second frame period may correspond to a second frame rate at which the image data is rendered by the host processor, the second frame rate greater than the first frame rate.

The scan driver may be configured to drive the display panel at a first driving frequency that corresponds to the first frame rate and may be configured to drive the display panel at a second driving frequency that corresponds to the second frame rate, the one or more dummy scan operations causing the display panel to have a same luminance at the first driving frequency and the second driving frequency.

BRIEF DESCRIPTION OF THE DRAWINGS

Illustrative, non-limiting embodiments will be more clearly understood from the following detailed description in conjunction with the accompanying drawings.

DETAILED DESCRIPTION OF EMBODIMENTS

Figure 1:
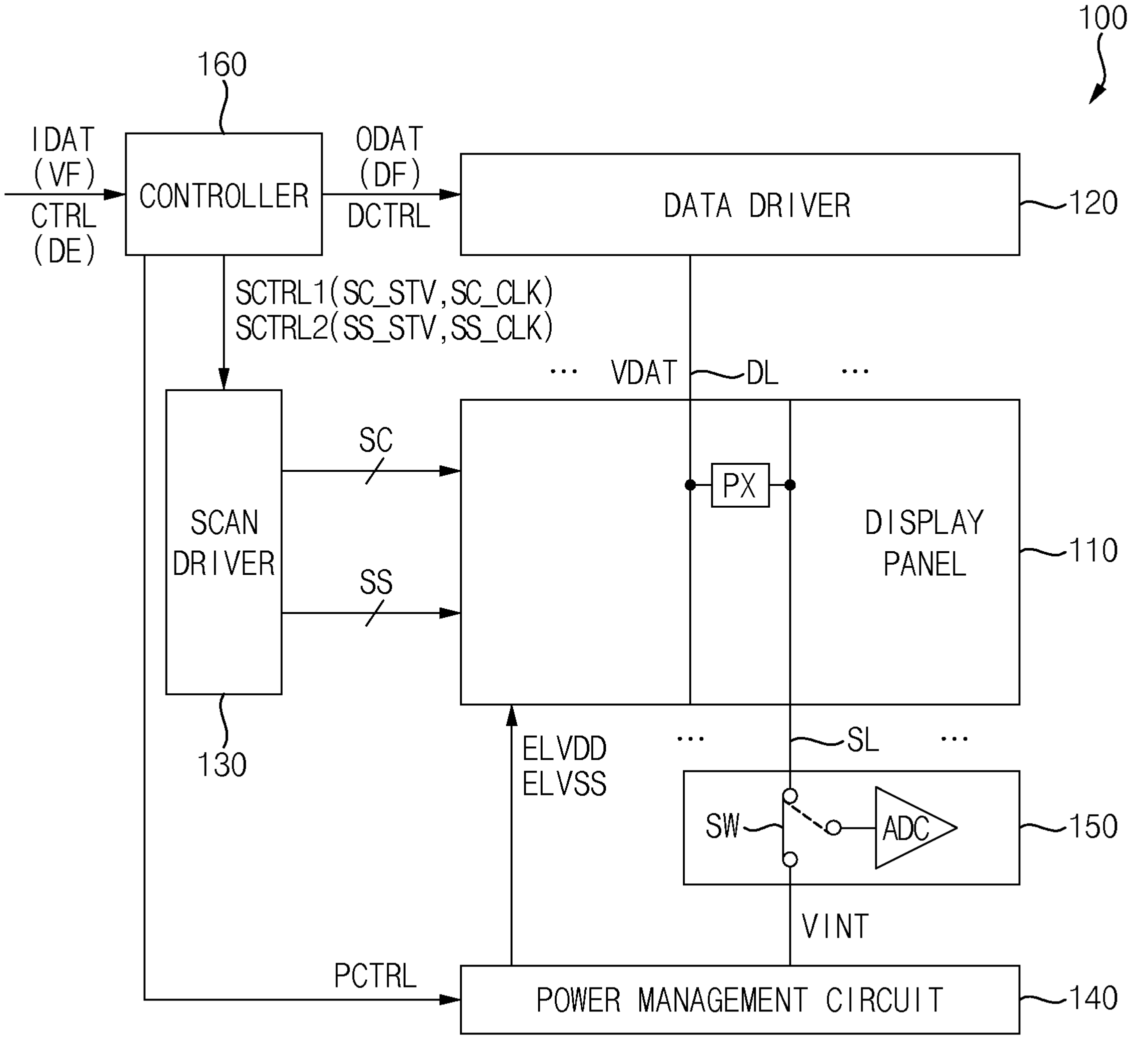
FIG. 1 is a block diagram illustrating a display device according to embodiments.

The embodiments are described more fully hereinafter with reference to the accompanying drawings. Like or similar reference numerals refer to like or similar elements throughout.

Figure 2:
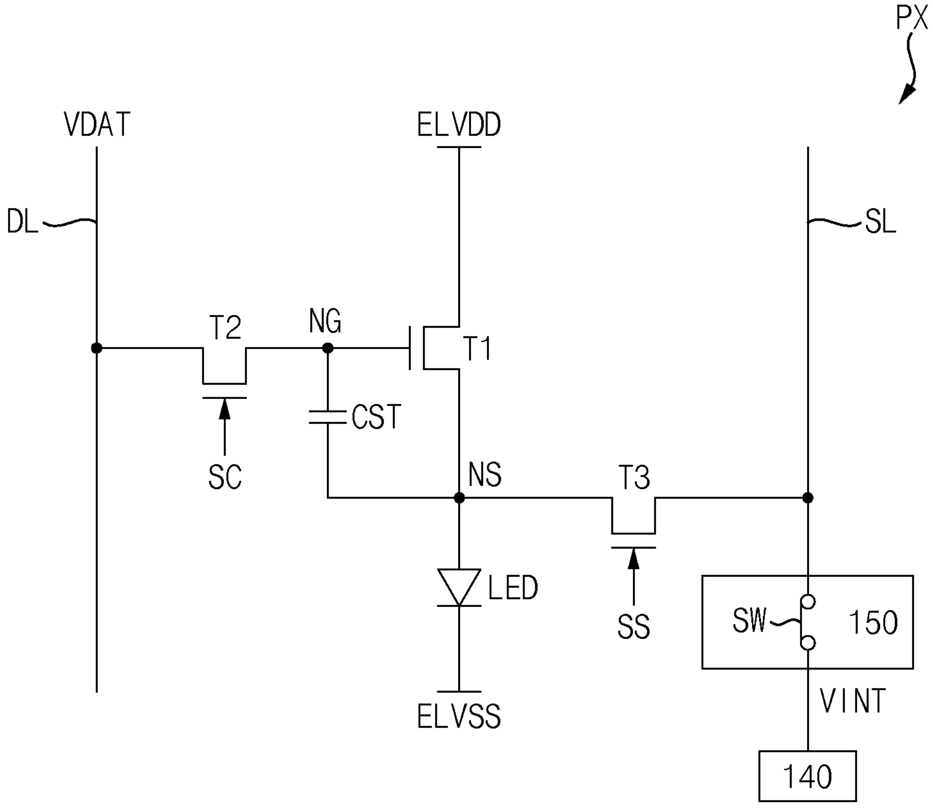
FIG. 2 is a circuit diagram illustrating an example of a pixel included in a display device according to embodiments.
Figure 3:
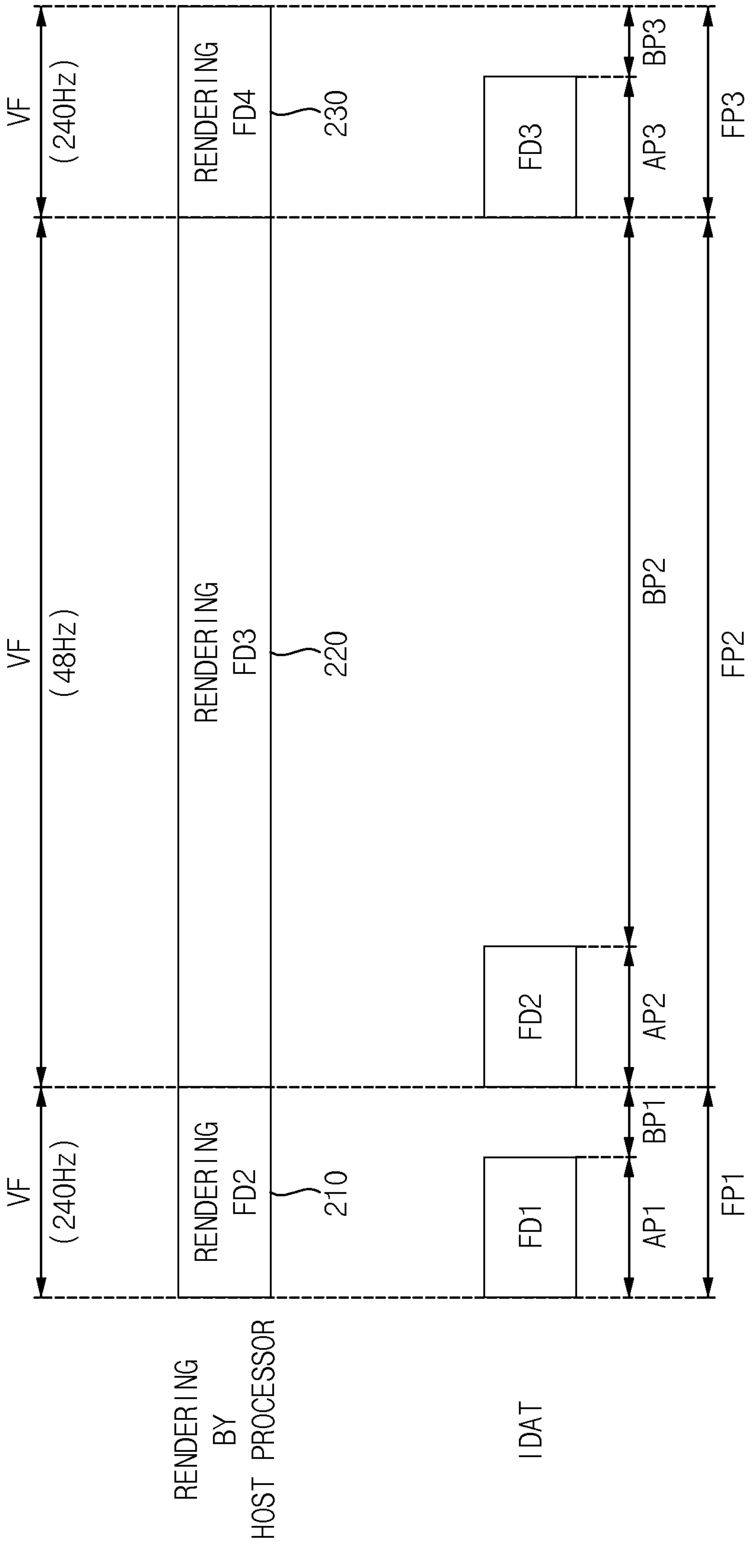
FIG. 3 is an embodiment of a timing diagram illustrating an example of input image data that are input at a variable frequency.
Figure 4:
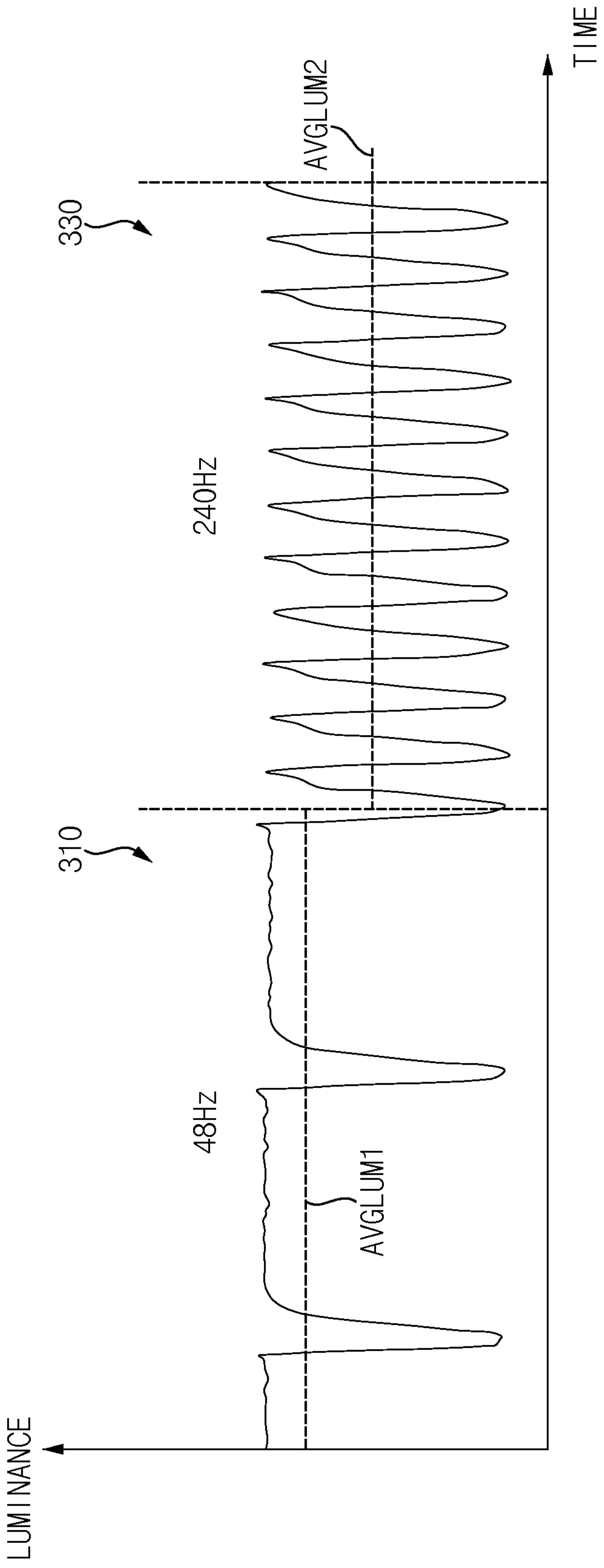
FIG. 4 is a diagram illustrating an example of luminance of a display panel driven at different driving frequencies in one type of display device which has been proposed.
Figure 5:
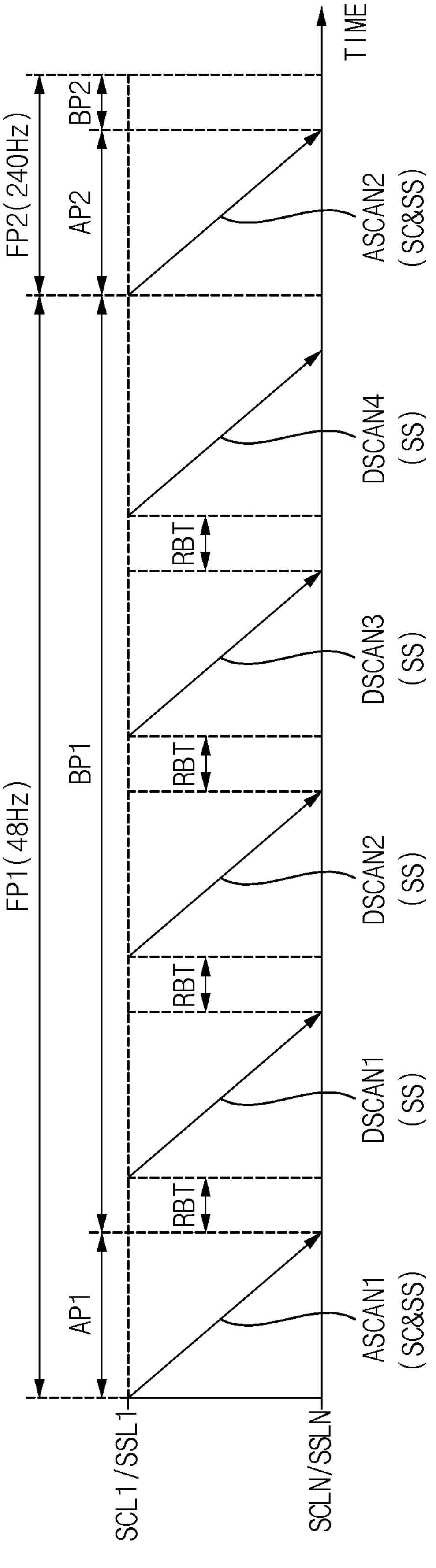
FIG. 5 is a diagram illustrating an example of an active scan operation and a dummy scan operation performed in a display device according to embodiments.
Figure 6:
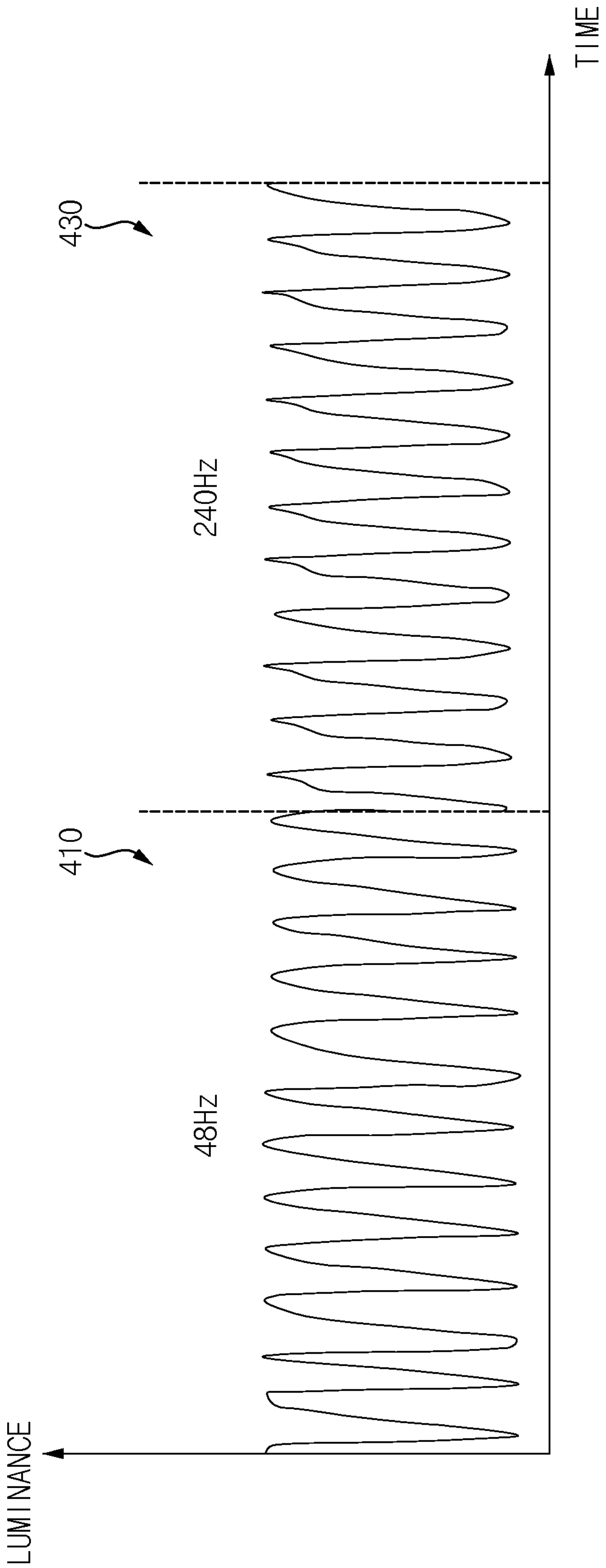
FIG. 6 is a diagram illustrating an example of luminance of a display panel driven at different driving frequencies in a display device according to embodiments.
Figure 7:
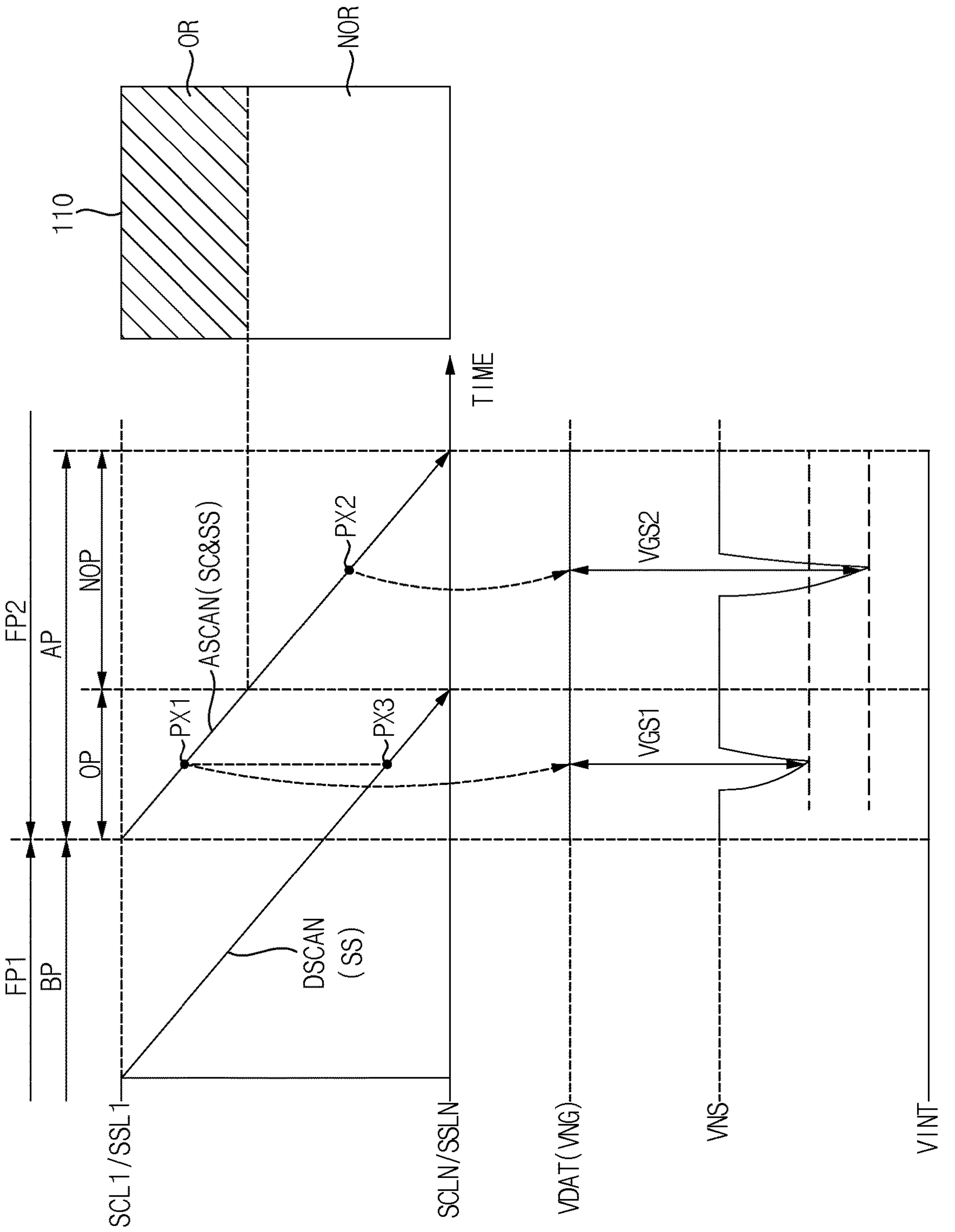
FIG. 7 is a diagram for describing an example of a luminance difference (or deviation) between upper and lower regions of a display panel in a case where a dummy scan operation and an active scan operation overlap each other.

FIG. 1 is a block diagram illustrating a display device according to embodiments. FIG. 2 is a circuit diagram illustrating an example of a pixel included in a display device according to embodiments. FIG. 3 is a timing diagram illustrating an example of input image data that are input at a variable frequency. FIG. 4 is a diagram illustrating an example of luminance of a display panel driven at different driving frequencies in one type of display device which has been proposed. FIG. 5 is a diagram illustrating an example of an active scan operation and a dummy scan operation performed in a display device according to embodiments. FIG. 6 is a diagram illustrating an example of luminance of a display panel driven at different driving frequencies in a display device according to embodiments. FIG. 7 is a diagram for describing an example of a luminance difference (or deviation) between upper and lower regions of a display panel in a case where a dummy scan operation and an active scan operation overlap each other.

Figure 8:
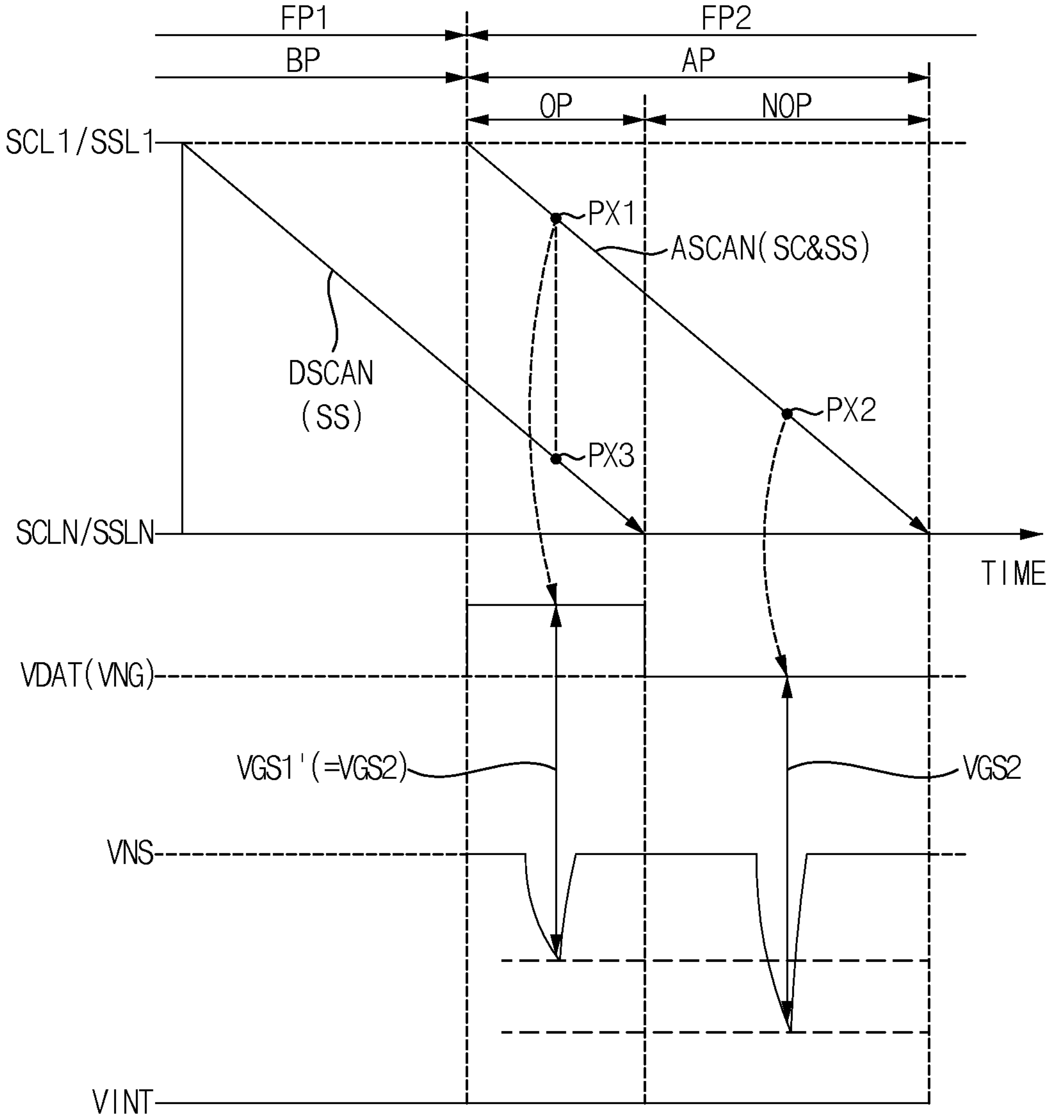
FIG. 8 is a diagram for describing an example where a voltage level of a data voltage is changed to eliminate or reduce a luminance difference between upper and lower regions of a display panel in a display device according to embodiments.
Figure 9:
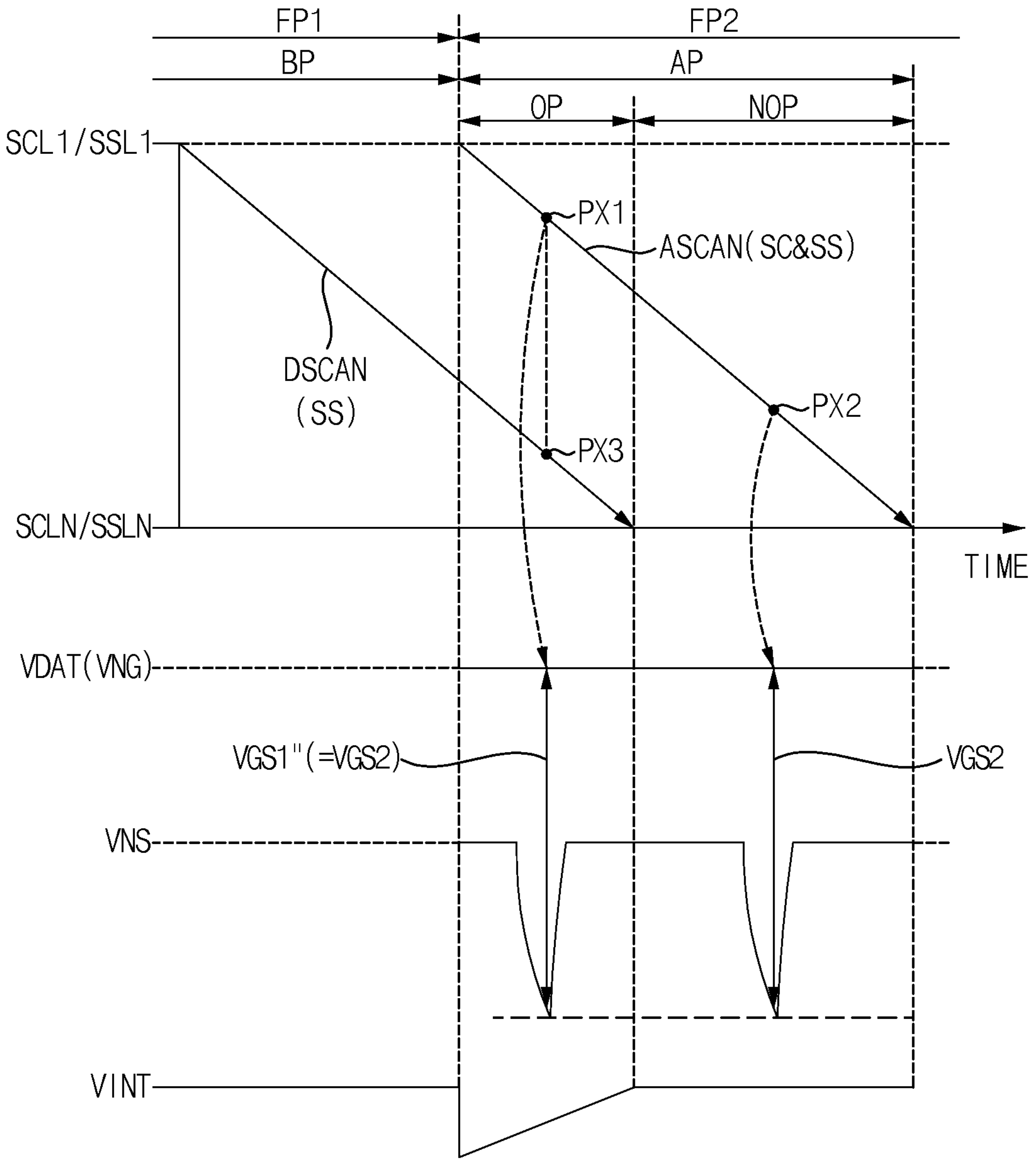
FIG. 9 is a diagram for describing an example where a voltage level of an initialization voltage is changed to eliminate or reduce a luminance difference between upper and lower regions of a display panel in a display device according to embodiments.

FIG. 8 is a diagram for describing an example where a voltage level of a data voltage is changed to eliminate or reduce a luminance difference between upper and lower regions of a display panel in a display device according to embodiments. FIG. 9 is a diagram for describing an example where a voltage level of an initialization voltage is changed to eliminate or reduce a luminance difference between upper and lower regions of a display panel in a display device according to embodiments.

Referring to FIG. 1, a display device 100 according to embodiments may include a display panel 110, a data driver 120, a scan driver 130, a power management circuit 140, a sensing circuit 150, and a controller 160. The display panel 110 includes a plurality of pixels PX. The data driver 120 provides a data voltage VDAT to each of the plurality of pixels PX. The scan driver 130 provides a first scan signal SC and a second scan signal SS to each of the plurality of pixels PX. The power management circuit 140 generates voltages ELVDD, ELVSS and VINT. The sensing circuit 150 is connected to the display panel 110 through sensing lines SL. The controller 160 controls an operation of the display device 100.

The display panel 110 may include a plurality of data lines DL, a plurality of first scan lines, a plurality of second scan lines, a plurality of sensing lines SL, and the plurality of pixels PX connected thereto. In some embodiments, each pixel PX may include a light emitting element, and the display panel 110 may be a light emitting display panel.

For example, as illustrated in FIG. 2, each pixel PX may have a 3T1C structure including a first transistor T1, a second transistor T2, a third transistor T3, a capacitor CST and a light emitting element LED. The capacitor CST may store the data voltage VDAT transferred by the second transistor T2 from the data line DL. The capacitor CST may be referred to as a storage capacitor for storing the data voltage VDAT. In some embodiments, the capacitor CST may include a first electrode connected to a first node NG (e.g., a gate node) and a second electrode connected to a second node NS (e.g., a source node).

The first transistor T1 may generate a driving current based on the data voltage VDAT stored in the capacitor CST. The first transistor T1 may be referred to as a driving transistor for generating the driving current. In some embodiments, the first transistor T1 may include a gate connected to the first node NG, a first terminal (e.g., a drain) receiving a first power supply voltage ELVDD, and a second terminal (e.g., a source) connected to the second node NS.

The second transistor T2 may transfer the data voltage VDAT of the data line DL to the first node NG in response to the first scan signal SC. The second transistor T2 may be referred to as a scan transistor. In some embodiments, the second transistor T2 may include a gate receiving the first scan signal SC, a first terminal connected to the data line DL, and a second terminal connected to the first node NG.

The third transistor T3 may connect the second node NS to the sensing line SL in response to the second scan signal SS. While a switch SW of the sensing circuit 150 connects the sensing line SL to the power management circuit 140, the power management circuit 140 may apply an initialization voltage VINT to the sensing line SL. The third transistor T3 may transfer the initialization voltage VINT of the sensing line SL to the second node NS in response to the second scan signal SS. In one embodiment, while the switch SW of the sensing circuit 150 connects the sensing line SL to an analog-to-digital converter ADC of the sensing circuit 150, the third transistor T3 may connect the sensing line SL to the second node NS in response to the second scan signal SS. The sensing circuit 150 may sense a characteristic of the pixel PX through the sensing line SL. In some embodiments, the third transistor T3 may include a gate receiving the second scan signal SS, a first terminal connected to the second node NS, and a second terminal connected to the sensing line SL.

The light emitting element LED may emit light based on the driving current flowing from a line coupled to the first power supply voltage ELVDD to a line coupled to a second power supply voltage ELVSS. In some embodiments, the light emitting element LED may include an anode connected to the second node NS, and a cathode receiving the second power supply voltage ELVSS. In some embodiments, the light emitting element LED may be an organic light emitting diode (OLED). In other embodiments, the light emitting element LED may be a nano light emitting diode (NED), a quantum dot (QD) light emitting diode, a micro light emitting diode, an inorganic light emitting diode, or any other suitable light emitting element.

In some embodiments, as illustrated in FIG. 2, the first through third transistors T1, T2 and T3 may be implemented as, but not limited to, N-type metal-oxide-semiconductor (NMOS) transistors. Further, although FIG. 2 illustrates an example of the pixel PX having the 3TIC structure, the structure of the pixel PX according to embodiments is not limited to the example of FIG. 2. For example, the pixel PX may have a different number of transistors and/or a different number of capacitors in other embodiments. Also, in other embodiments, the display panel 110 may be a liquid crystal display (LCD) panel, or any other suitable display panel.

The data driver 120 may generate the data voltages VDAT based on output image data ODAT and a data control signal DCTRL received from the controller 160. The data driver 120 may provide the data voltages VDAT to the plurality of pixels PX through the plurality of data lines DL. In some embodiments, the data control signal DCTRL may include, but is not limited to, an output data enable signal, a horizontal start signal and a load signal. Further, in some embodiments, the data driver 120 may receive the output image data ODAT at a driving frequency DF that is varied or changed within a driving frequency range (e.g., from about 48 Hz to about 240 Hz) from the controller 160. In some embodiments, the data driver 120 and the sensing circuit 150 may be implemented as a single integrated circuit. This integrated circuit may be referred to as a readout source driver integrated circuit (RSIC). In other embodiments, the data driver 120 and the controller 160 may be implemented as a single integrated circuit. This integrated circuit may be referred to as a timing controller embedded data driver (TED) integrated circuit. In still other embodiments, the data driver 120, the sensing circuit 150, and the controller 160 may each be implemented as separate integrated circuits.

The scan driver 130 may generate the first and second scan signals SC and SS based on first and second scan control signals SCTRL1 and SCTRL2 received from the controller 160. The scan driver 130 may sequentially provide the first and second scan signals SC and SS to the plurality of pixels PX on a row basis through the plurality of first and second scan lines, respectively. In some embodiments, the first scan control signal SCTRL1 may include a first scan start signal SC_STV and a first scan clock signal SC_CLK for generating the first scan signals SC. The second scan control signal SCTRL2 may include a second scan start signal SS_STV and a second scan clock signal SS_CLK for generating the second scan signals SS. Further, in some embodiments, the first scan signal SC may be referred to as a scan signal, and the second scan signal SS may be referred to as a sensing signal. In some embodiments, the scan driver 130 may be integrated or formed in the display panel 110. In other embodiments, the scan driver 130 may be implemented as one or more integrated circuits.

The power management circuit 140 may generate voltages ELVDD, ELVSS and VINT for operating the display device 100. In some embodiments, the power management circuit 140 may generate the first power supply voltage ELVDD (e.g., a high power supply voltage), a second power supply voltage ELVSS (e.g., a low power supply voltage) and the initialization voltage VINT provided to the display panel 110. In some embodiments, the power management circuit 140 may be implemented as an integrated circuit, which may be referred to as a power management integrated circuit (PMIC). In other embodiments, the power management circuit 140 may be included, for example, in the controller 160 or the data driver 120.

The sensing circuit 150 may sense the characteristics of the pixels PX through the sensing lines SL. In some embodiments, the sensing circuit 150 may include the switch SW that selectively connects the sensing line SL to the power management circuit 140 or the analog-to-digital converter ADC. When connected, the analog-to-digital converter ADC may convert an analog signal (e.g., a voltage or a current) of the sensing line SL into a digital signal. The switch SW may connect the sensing line SL to the power management circuit 140 at a time when the sensing operation is not performed. The switch may connect the sensing line SL to the analog-to-digital converter ADC while the sensing operation is performed. The analog-to-digital converter ADC may convert the analog signal received from the pixel PX through the sensing line SL into digital sensing data. The sensing circuit 150 may provide the digital sensing data representing the characteristic of the pixel PX to the controller 160.

The controller 160 (e.g., a timing controller (TCON)) may receive input image data IDAT and a control signal CTRL from an external host processor (e.g., a graphics processing unit (GPU), an application processor (AP) or a graphics card). In some embodiments, the input image data IDAT may be RGB image data including red image data, green image data and blue image data. The image data IDAT may include image data of other colors in another embodiment. The control signal CTRL may include an input data enable signal DE that toggles in an active period AP in which the input image data IDAT are transferred. In some embodiments, the control signal CTRL may further include, but is not limited to, a vertical synchronization signal, a horizontal synchronization signal, a master clock signal, etc.

The controller 160 may generate the data control signal DCTRL, the first and second scan control signals SCTRL1 and SCTRL2, a power control signal PCTRL and the output image data ODAT based on the control signal CTRL and the input image data IDAT. The controller 160 may control operation of the data driver 120 by providing the data control signal DCTRL and the output image data ODAT to the data driver 120, may control operation of the scan driver 130 by providing the first and second scan control signals SCTRL1 and SCTRL2 to the scan driver 130, and may control operation of the power management circuit 140 by providing the power control signal PCTRL to the power management circuit 140.

The host processor may provide the input image data IDAT to the display panel 100 at a variable frequency VF (or a variable frame rate) by changing a time length of a blank period in each frame period. The controller 160 may receive the input image data IDAT from the host processor at the variable frequency VF that is varied or changed within a variable frequency range. For example, a maximum frequency of the variable frequency range may be about 240 Hz, a minimum frequency of the variable frequency range may be about 48 Hz, and the variable frequency range may be from about 48 Hz to about 240 Hz. The variable frequency range may correspond to a different minimum and maximum frequency in other embodiments. Further, in the display device 100 according to embodiments, the driving frequency DF of the display panel 110 may be determined as the variable frequency VF that is varied or changed within the variable frequency range. For example, the controller 160 may control the data driver 120 and the scan driver 130 to drive the display panel 110 at the driving frequency DF, which may be based on or may be substantially the same as the variable frequency VF. In some embodiments, a mode of the display device 100 in which the display panel 110 is driven at the variable frequency VF (or the variable frame rate) may be referred to as a variable frame mode. For example, the variable frame mode may be, but is not be limited to, a Free-Sync mode, a G-Sync mode, etc.

For example, as illustrated in FIG. 3, a period or a frequency of renderings 210, 220 and 230 by the host processor (e.g., the GPU, the AP or the graphics card) may not be constant (e.g., in a case where game image data are rendered). The host processor may provide the input image data IDAT (or frame data FD1, FD2 and FD3) to the display device 100 in synchronization with these irregular periods or frequencies of the renderings 210, 220 and 230 in the variable frame mode. In one embodiment of the variable frame mode, each frame period FP1, FP2 and FP3 may include a constant active period AP1, AP2 and AP3 having a constant time length. The host processor may provide the frame data FD1, FD2 and FD3 to the display device 100 at the variable frequency VF by changing a time length of a blank period BP1, BP2 and BP3 of each frame period FP1, FP2 and FP3. Here, each active period AP1, AP2 and AP3 may be a period in which the data voltages VDAT are written or stored in the plurality of pixels PX of the display panel 110. For example, each active period AP1, AP2 and AP3 may include a data writing (or storing) period and an emission period. The data wiring (or storing) period may include a period in which the data voltages VDAT are written to the capacitors CST of the pixels PX. The emission period may be a period in which the light emitting elements LED of the pixels PX emit light based on the data voltages VDAT stored in the capacitors CST. For example, where the display panel 110 includes the pixels PX in first through Nth rows (where N is an integer greater than or equal to 2), the first scan signals SC and the second scan signals SS may be sequentially applied to the pixels PX in the first through Nth rows on a row basis in each active period AP1, AP2 and AP3. In this case, the second transistors T2 and the third transistors T3 of the pixels PX in the first through Nth rows may be sequentially turned on, and the data voltages VDAT may be sequentially written or stored in the pixels PX in the first through Nth rows. Further, each blank period (e.g., BP1) may be a period between adjacent active periods (e.g., AP1 and AP2), in which no data voltage VDAT is written or stored in the plurality of pixels PX of the display panel 110. In each blank period BP1, BP2 and BP3, the first scan signals SC and/or the second scan signals SS may not be applied to the plurality of pixels PX of the display panel 110, and the second transistors T2 and/or the third transistors T3 of the plurality of pixels PX may not be turned on.

In the example of FIG. 3, if a rendering 210 for second frame data FD2 is performed at a frequency of about 240 Hz in a first frame period FP1, the host processor may provide first frame data FD1 to the display device 100 at the variable frequency VF of about 240 Hz in the first frame period FP1. Further, the host processor may output the second frame data FD2 during an active period AP2 of a second frame period FP2, and may extend the duration of a blank period BP2 of the second frame period FP2 until a rendering 220 for third frame data FD3 is completed. Thus, in the second frame period FP2, if the rendering 220 for the third frame data FD3 is performed at a lower frequency of about 48 Hz, the host processor may provide the second frame data FD2 to the display device 100 at the variable frequency VF of about 48 Hz by increasing a time length of the blank period BP2 of the second frame period FP2. As a result, the blank period BP2 of the second frame period is greater than the blank period BP1 of the first frame period. In a third frame period FP3, if a rendering 230 for fourth frame data FD4 is performed again at a frequency of about 240 Hz, the host processor may provide the third frame data FD3 to the display device 100 again at the variable frequency VF of about 240 Hz.

In contrast, other display devices which have been proposed which operate in a variable frame mode may have different luminance at different driving frequencies. For example, in these proposed display devices, each pixel may receive the second scan signal only once in each frame period FP1, FP2 and FP3, the second node of each pixel may be initialized only once based on the initialization voltage in each frame period FP1, FP2 and FP3, and the light emitting element of each pixel may be turned off only once in each frame period FP1, FP2 and FP3. Further, in a case where the driving frequency is changed, or in a case where the time length of the frame periods FP1, FP2, and FP3 is changed, the number of times the second scan signal is applied to each pixel for a certain period of time, or the number of times the light emitting element of each pixel is turned off for the certain period of time, may be changed. Accordingly, although these proposed display devices display an image of the same gray level, the luminance of the display panel may be changed when the driving frequency of the display panel is changed.

FIG. 4 illustrates an example illustrating a luminance difference in the proposed display device based on a driving frequency. As shown in FIG. 4, this display device may have a luminance 310 when the display panel is driven at a lower driving frequency of about 48 Hz, and a luminance 330 when the display panel is driven at a higher driving frequency of about 240 Hz. As illustrated in FIG. 4, during the same time period, each light emitting diode of the display panel of the proposed display device may be off about 2.5 times when the driving frequency is about 48 Hz, while each light emitting diode of the display panel may be off about 12 times when the driving frequency is about 240 Hz. Accordingly, the average luminance AVGLUM2 of the display panel driven at the driving frequency of about 240 Hz may be different from (e.g., lower than) an average luminance AVGLUM1 of the display panel driven at the driving frequency of about 48 Hz.

However, in the display device 100 according to embodiments, in order to reduce such a luminance deviation of the display panel 110 driven at different driving frequencies DF, the scan driver 130 may perform not only an active scan operation (that sequentially provides the first scan signal SC and the second scan signal SS to the pixels PX on a row basis in an active period of each frame period), but also a dummy scan operation. The dummy scan operation may sequentially provide the second scan signal SS to the pixels PX on a row basis in a blank period of each frame period. In some embodiments, the scan driver 130 may initiate the dummy scan operation after a predetermined time from an end time point of the active period (or a start time point of the blank period), or from a time point at which the active scan operation is performed for the pixels PX in the last row of the display panel 110. Further, in some embodiments, the predetermined time may correspond to a time length of a blank period of the minimum frame period (e.g., having a time length of about 4.2 ms) corresponding to the maximum frequency (e.g., about 240 Hz) of the variable frequency range. Further, in some embodiments, after the predetermined time from when the dummy scan operation is completed, the scan driver 130 may perform the dummy scan operation one or more additional times until expiration of the blank period.

For example, as illustrated in FIG. 5, in a first active period AP1 of a first frame period FP1 corresponding to a frequency of about 48 Hz, the scan driver 130 may perform a first active scan operation ASCAN1 that sequentially outputs the first and second scan signals SC and SS from the first and second scan lines SCL1 and SSL1 for a first pixel row to the first and second scan lines SCLN and SSLN for an Nth pixel row, where N is an integer greater than 1. After a predetermined time RBT from a start time point of a first blank period BP1 of the first frame period FP1, the scan driver 130 may perform a first dummy scan operation DSCAN1 that sequentially outputs the second scan signal SS from the second scan line SSL1 for the first pixel row to the second scan line SSLN for the Nth pixel row. While the first dummy scan operation DSCAN1 is performed, the data voltage VDAT stored in each pixel PX may be maintained since the first scan signal SC is not applied to each pixel PX, the second node NS of the pixel PX may be initialized, and the light emitting element LED of each pixel PX may be turned off.

Further, the second dummy scan operation DSCAN2 may be performed after the predetermined time RBT from a time point at which the first dummy scan operation DSCAN1 is completed, the third dummy scan operation DSCAN3 may be performed after the predetermined time RBT from a time point at which the second dummy scan operation DSCAN2 is completed, and the fourth dummy scan operation DSCAN4 may be performed after the predetermined time RBT from a time point at which the third dummy scan operation DSCAN3 is completed. Although four dummy scan operations are shown to occur during the blank period BP1, this is just an example and a different number of dummy scan operations may be performed during the blank period in another embodiment.

Further, a second active scan operation ASCAN2 may be performed in a second active period AP2 of a second frame period FP2 corresponding to the higher frequency of about 240 Hz. Also, in the second frame period FP2, no scan operation may be performed in a second blank period BP2 of the second frame period FP2 in a case where the second blank period BP2 is shorter than the predetermined time RBT.

As described above, in the display device 100 according to embodiments, since the dummy scan operations DSCAN1, DSCAN2, DSCAN3 and DSCAN4 are performed during the blank period BP1, the display panel 110 may have substantially the same luminance at different driving frequencies DF. For example, in the display device 100 according to embodiments, as illustrated in FIG. 6, during the same time period (e.g., about 53 ms), each light emitting element LED of the display panel 110 driven at the driving frequency DF of about 48 Hz and each light emitting element LED of the display panel 110 driven at the driving frequency DF of about 240 Hz may be turned off substantially the same number of times, which in this example is about 12 times. Accordingly, in the display device 100 according to embodiments, the luminance 410 of the display panel 110 driven at the driving frequency DF of about 48 Hz and the luminance 430 of the display panel 110 driven at the driving frequency DF of about 240 Hz may be substantially the same as each other. The number of dummy scan operations performed in the example described above spans the entire duration of the blank period at the lower driving frequency, taking the predetermined times RBT into consideration. However, in other embodiments the number of dummy scan operations and corresponding predetermined times RBT may not span the entire blank period. In this case, the difference in luminance may be reduced relative to one another for different driving frequencies DF.

In a case where a second frame period starts before a dummy scan operation initiated in a blank period of a first frame period is completed, a luminance difference (or deviation) occurs between an upper region of the display panel 110 and a lower region of the display panel 110. For example, as illustrated in FIG. 7, in a non-overlap period NOP in which only an active scan operation ASCAN is performed after a dummy scan operation DSCAN is completed, the second nodes NS of the pixels PX2 in one row may be initialized (or discharged). However, in an overlap period OP in which the dummy scan operation DSCAN initiated in the blank period BP of the first frame period FP1 and the active scan operation ASCAN in the active period AP of the second frame period FP2 are simultaneously performed, the second scan signal SS may be substantially simultaneously applied to the pixels PX1 and PX3 in two rows. In this case, the second nodes NS of the pixels PX1 and PX3 in the two rows may be substantially simultaneously initialized (or discharged). Thus, a sink current flowing through the sensing line SL in the overlap period OP may be greater than a sink current flowing through the sensing line SL in the non-overlap period NOP. Also, a voltage drop through the sensing line SL in the overlap period OP may be greater than a voltage drop through the sensing line SL in the non-overlap period NOP. Accordingly, the second node NS of a first pixel PX1 receiving the data voltage VDAT in the overlap period OP may not be sufficiently initialized or discharged, and a voltage VNS of the second node NS of the first pixel PX1 may be higher than a voltage VNS of the second node NS of the second pixel PX2 receiving the data voltage VDAT in the non-overlap period NOP.

Further, with respect to the same gray level, there may be a difference between a voltage VNG of the first node N1 and the voltage VNS of the second node NS of the first pixel PX1. For example, a gate-source voltage VGS1 of the first transistor T1 of the first pixel PX1 may be less than a gate-source voltage VGS2 of the first transistor T1 of the second pixel PX2. As a result, the first pixel PX1 may emit light with luminance lower than that of the second pixel PX2. Therefore, the luminance of an overlap region OR (e.g., the upper region) of the display panel 110 receiving the data voltage VDAT in the overlap period OP may be lower than the luminance of a non-overlap region NOR (e.g., the lower region) of the display panel 110 receiving the data voltage VDAT in the non-overlap period NOP. As a result, a luminance difference (or deviation) may occur between the overlap region OR (e.g., the upper region) and the non-overlap region NOR (e.g., the lower region) of the display panel 110.

To eliminate or reduce the luminance difference (or deviation) between the upper and lower regions OR and NOR of the display panel 110, the display device 100 according to embodiments may change a voltage level of the data voltage VDAT and/or a voltage level of the initialization voltage VINT in the overlap period OP.

In some embodiments, as illustrated in FIG. 8, the display device 100 may change the voltage level of the data voltage VDAT in the overlap period OP. For example, with respect to the same gray level, the voltage level of the data voltage VDAT in the overlap period OP may be higher than the voltage level of the data voltage VDAT in the non-overlap period NOP. Thus, although the voltage VNS of the second node NS of the first pixel PX1 is higher than the voltage VNS of the second node NS of the second pixel PX2, the voltage level of the data voltage VDAT applied to the first pixel PX1 is higher than the voltage level of the data voltage VDAT applied to the second pixel PX2. As a result, the gate-source voltage VGS1' of the first transistor T1 of the first pixel PX1 may be substantially the same as the gate-source voltage VGS2 of the first transistor T1 of the second pixel PX2. Accordingly, the first pixel PX1 and the second pixel PX2 may emit light with substantially the same luminance, e.g., the luminance difference between the overlap region OR (e.g., the upper region) and the non-overlap region NOR (e.g., the lower region) of the display panel 110 may be eliminated or reduced.

In other embodiments, as illustrated in FIG. 9, the display device 100 may change the voltage level of the initialization voltage VINT in the overlap period OP. For example, the voltage level of the initialization voltage VINT in the overlap period OP may be lower than the voltage level of the initialization voltage VINT in the non-overlap period NOP. In some embodiments, as illustrated in FIG. 9, the voltage level of the initialization voltage VINT may be decreased at a start time point of the overlap period OP, and may be gradually increased (at a predetermined rate) to an original voltage level during the overlap period OP. Accordingly, although the voltage drop through the sensing line SL in the overlap period OP is greater than the voltage drop through the sensing line SL in the non-overlap period NOP, the voltage level of the initialization voltage VINT in the overlap period OP may be lower than the voltage level of initialization voltage VINT in the non-overlap period NOP. Thus, the voltage VNS of the second node NS of the first pixel PX1 may be substantially the same as the voltage VNS of the second node NS of the second pixel PX2. Further, with respect to the same gray level, the gate-source voltage VGS1" of the first transistor T1 of the first pixel PX1 may be substantially the same as the gate-source voltage VGS2 of the first transistor T1 of the second pixel PX2. Accordingly, the first pixel PX1 and the second pixel PX2 may emit light with substantially the same luminance, e.g., the luminance difference between the overlap region OR (e.g., the upper region) and the non-overlap region NOR (e.g., the lower region) of the display panel 110 may be eliminated or reduced.

In still other embodiments, the display device 100 may change both the voltage level of the data voltage VDAT and the voltage level of the initialization voltage VINT in the overlap period OP to achieve the aforementioned results.

As described above, the display device 100 according to embodiments may change the voltage level of the data voltage VDAT and/or the voltage level of the initialization voltage VINT in the overlap period OP, in which the dummy scan operation DSCAN and the active scan operation ASCAN are simultaneously performed. Accordingly, the first pixel PX1 receiving the data voltage VDAT in the overlap period OP and the second pixel PX2 receiving the data voltage VDAT in the non-overlap period NOP may emit light with substantially the same luminance with respect to the same gray level, and the luminance difference (or deviation) between the upper and lower regions of the display panel 110 may be eliminated or reduced.

Figure 10:
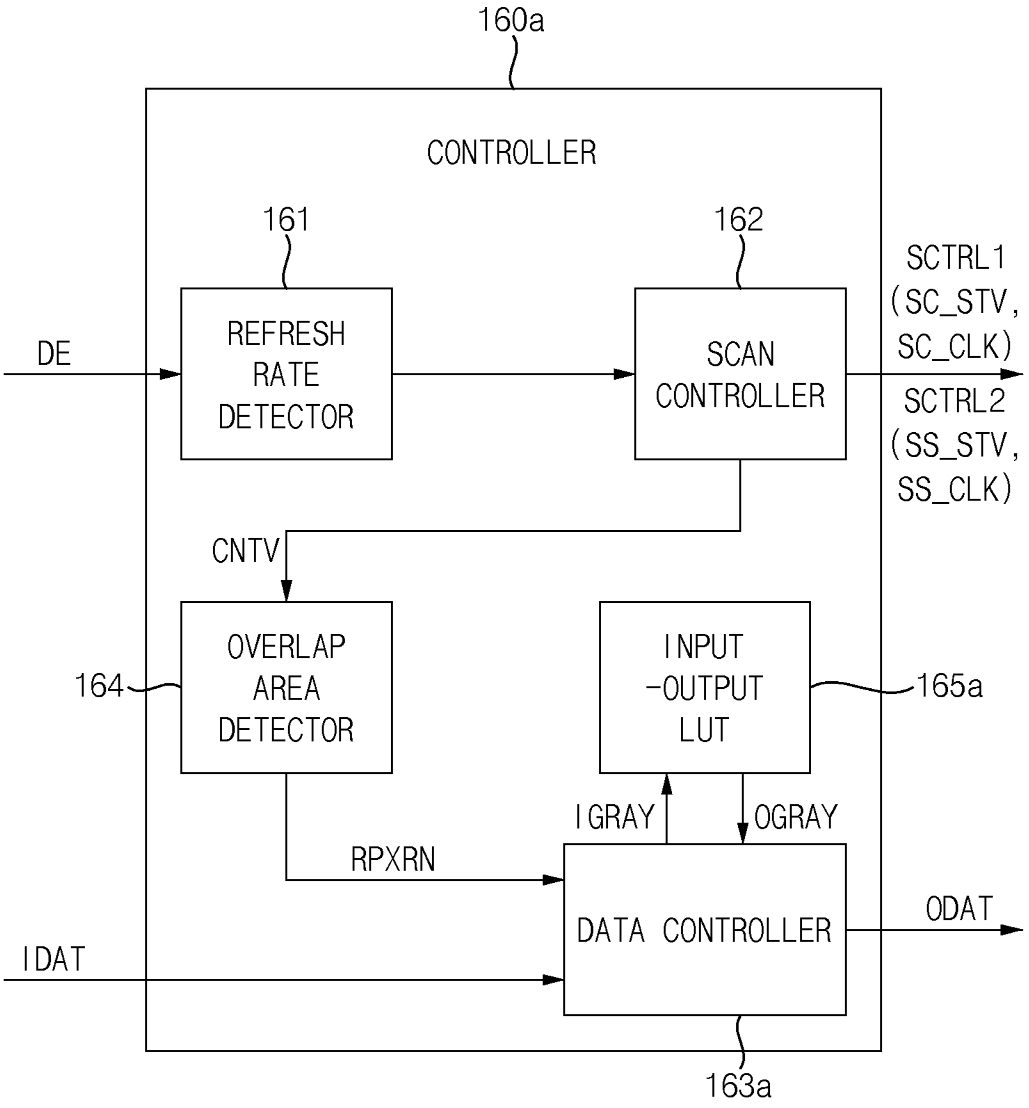
FIG. 10 is a block diagram illustrating a controller included in a display device according to embodiments.
Figure 11:
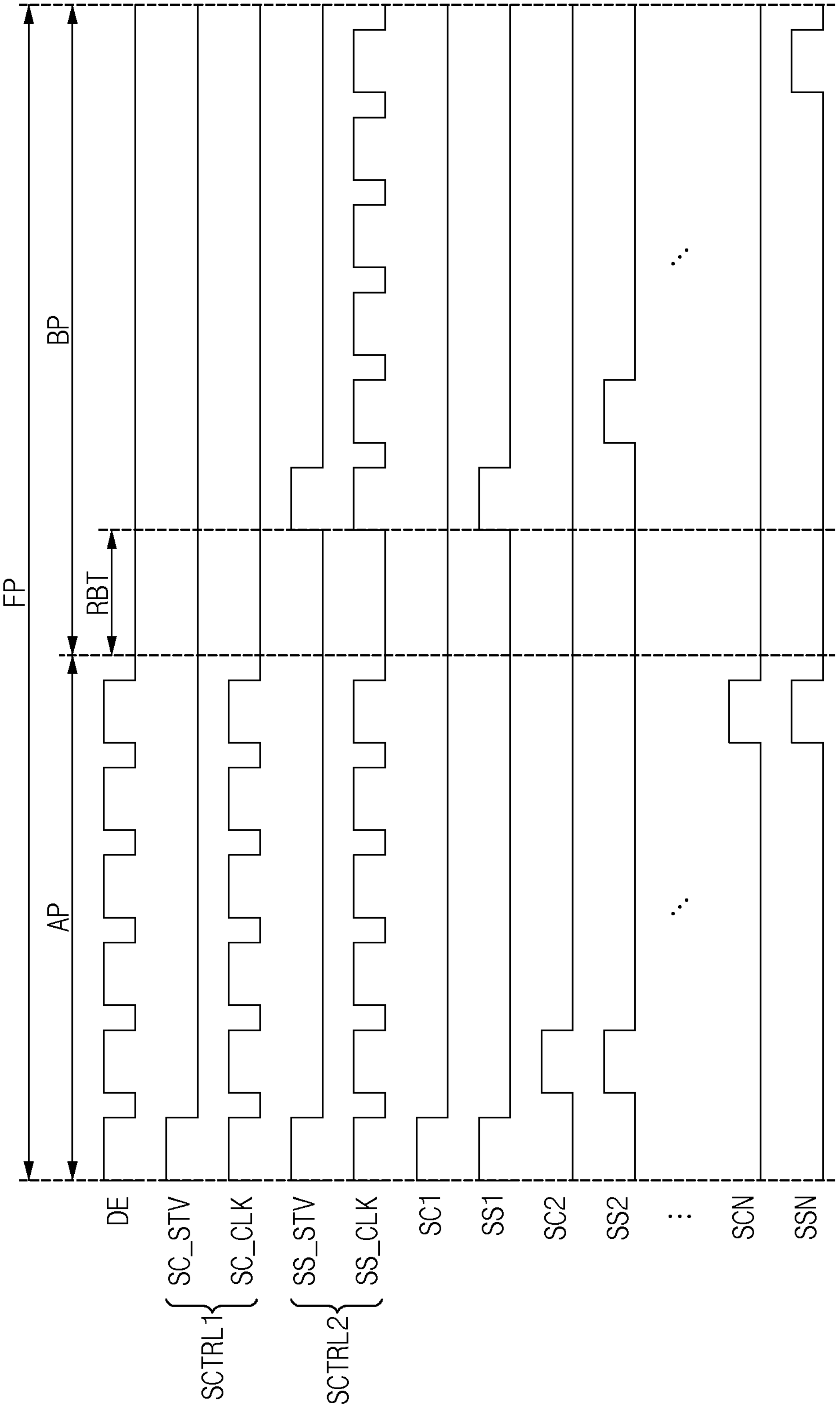
FIG. 11 is a timing diagram for describing an example of an operation of a refresh rate detector and a scan controller illustrated in FIG. 10.
Figure 12:
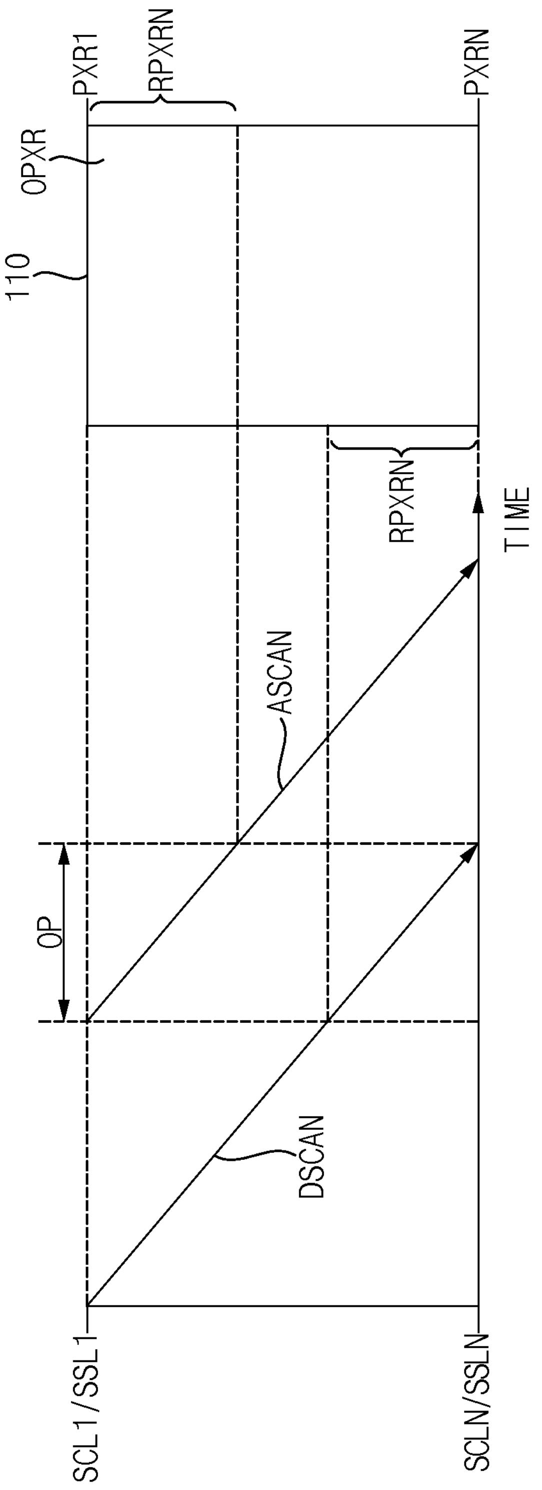
FIG. 12 is a diagram for describing an example of an overlap area detector and a data controller illustrated in FIG. 10.

FIG. 10 is a block diagram illustrating a controller included in a display device according to embodiments. FIG. 11 is a timing diagram for describing an example of an operation of a refresh rate detector and a scan controller illustrated in FIG. 10. FIG. 12 is a diagram for describing an example of an overlap area detector and a data controller illustrated in FIG. 10.

Referring to FIGS. 1 and 10, a controller 160*a* of display device 100 may include a refresh rate detector 161, a scan controller 162 and a data controller 163*a*. In some embodiments, the controller 160*a* may further include an overlap area detector 164 and an input-output lookup table 165*a*.

The refresh rate detector 161 may detect a start time point of an active period of each frame period and a start time point of a blank period of each frame period. In some embodiments, the refresh rate detector 161 may detect the start time point of the active period and the start time point of the blank period based on, for example, an input data enable signal DE received from an external host processor. For example, as shown in FIG. 11, the input data enable signal DE may periodically toggle in the active period AP and have a constant level in the blank period BP. The refresh rate detector 161 may determine that the active period AP starts when the input data enable signal DE starts toggling, and may determine that the blank period BP starts when the toggling of the input data enable signal DE is stopped, e.g., has a substantially constant level. Further, the refresh rate detector 161 may inform the scan controller 162 of the start time point of the active period AP and the start time point of the blank period BP.

The scan controller 162 may generate first and second scan control signals SCTRL1 and SCTRL2 for sequentially providing first and second scan signals SC and SS to pixels PX in the active period AP. As illustrated in FIG. 11, the first scan control signal SCTRL1 may include a first scan start signal SC_STV having a pulse at the start time point of the active period AP and a first scan clock signal SC_CLK periodically toggling in the active period AP. The second scan control signal SCTRL2 may include a second scan start signal SS_STV having a pulse at the start time point of the active period AP and a second scan clock signal SS_CLK periodically toggling in the active period AP. The scan driver 130 may sequentially generate the first scan signals SC1, SC2, . . . , SCN based on the first scan start signal SC_STV and the first scan clock signal SC_CLK, and may sequentially generate the second scan signals SS1, SS2, . . . , SSN based on the second scan start signal SS_STV and the second scan clock signal SS_CLK.

Further, after a predetermined time RBT from an end time point of the active period AP (or from the start time point of the blank period BP), the scan controller 162 may generate the second scan control signal SCTRL2 for sequentially providing the second scan signals SS to the pixels PX. For example, as shown in FIG. 10, after the predetermined time RBT from the start time point of the blank period BP, the scan controller 162 may not provide the first scan start signal SC_STV and the first scan clock signal SC_CLK to the scan driver 130, but may provide the second scan start signal SS_STV and the second scan clock signal SS_CLK to the scan driver 130. The scan driver 130 may sequentially generate the second scan signals SS1, SS2, . . . , SSN based on the second scan start signal SS_STV and the second scan clock signal SS_CLK.

In some embodiments, during a dummy scan operation that sequentially provides the second scan signals SS1, SS2, . . . , SSN to the pixels PX on a row basis in the blank period BP, the scan controller 162 may generate a count value CNT by counting receiving pixel rows that receive the second scan signals SS1, SS2, . . . , SSN by the dummy scan operation until a next frame period starts. For example, the scan controller 162 may count the receiving pixel rows by counting pulses of the second scan clock signal SS_CLK.

The overlap area detector 164 may calculate the number RPXRN of remaining pixel rows that are to receive the second scan signal SS by the dummy scan operation in an overlap period of the next frame period based on the count value CNT. For example, as illustrated in FIG. 12, the count value CNT may represent the number of the receiving pixel rows that receive the second scan signals SS1, SS2, . . . , SSN by the dummy scan operation before the next frame period starts. Overlap area detector 164 may calculate the number RPXRN of the remaining pixel rows that are to receive the second scan signal SS in the overlap period OP by subtracting the number of the receiving pixel rows represented by the count value CNT from the number of all pixel rows of a display panel 110 from a first pixel row PXR1 to an Nth pixel row PXRN.

The data controller 163*a* may determine overlapping pixel rows OPXR that receive the first and second scan signals SC and SS by an active scan operation ASCAN in the overlap period OP based on the RPXRN number of the remaining pixel rows from the overlap are detector 164. For example, the data controller 163*a* may determine pixel rows of the number RPXRN from the first pixel row PXR1 as the overlapping pixel rows OPXR.

The data controller 163*a* may generate output image data ODAT by increasing input image data IDAT for the overlapping pixel rows OPXR. In some embodiments, the data controller 163*a* may convert the input image data IDAT into the output image data ODAT using the input-output lookup table 165*a*. For example, the input-output lookup table 165*a* may store a plurality of output gray levels corresponding to a plurality of input gray levels. With respect to the overlapping pixel rows OPXR, the data controller 163*a* may obtain an output gray level OGRAY corresponding to an input gray level IGRAY (represented by the input image data IDAT) using the input-output lookup table 165*a*. The data controller 163*a* may then generate the output image data ODAT representing the obtained output gray level OGRAY. The output gray level OGRAY may be different from (e.g., higher than) the input gray level IGRAY, and the data driver 120 may increase a voltage level of a data voltage VDAT in the overlap period OP based on the output image data ODAT representing the output gray level OGRAY. Accordingly, as illustrated in FIG. 8, a gate-source voltage VGS1' of a first transistor T1 of a first pixel PX1 may be substantially the same as a gate-source voltage VGS2 of a first transistor T1 of a second pixel PX2, and a luminance difference between upper and lower regions of the display panel 110 may be eliminated or reduced.

Figure 13:
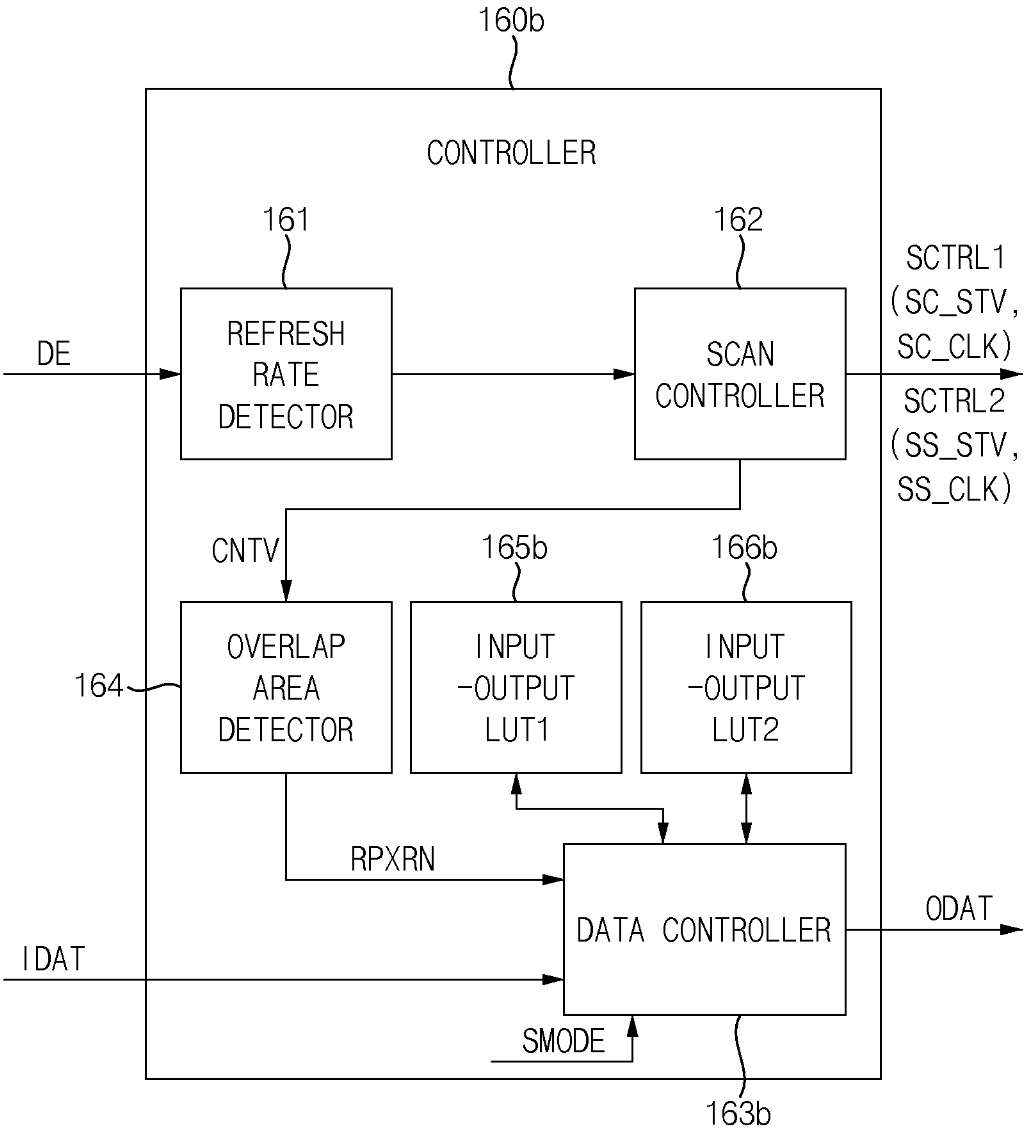
FIG. 13 is a block diagram illustrating a controller included in a display device according to embodiments.

FIG. 13 is a block diagram illustrating a controller 160*b* included in a display device according to embodiments. Referring to FIGS. 1 and 13, the controller 160*b* of a display device 100 may include a refresh rate detector 161, a scan controller 162, a data controller 163*b*, an overlap area detector 164, a first input-output lookup table 165*b* and a second input-output lookup table 166*b*. The controller 160*b* of FIG. 13 may have a similar configuration and a similar operation to a controller 160*a* of FIG. 10, except that the data controller 163*b* selectively uses the first and second input-output lookup tables 165*b* and 166*b* according to a driving mode of the display device 100.

The first input-output lookup table 165*b* may store a plurality of first output gray levels corresponding to a plurality of input gray levels. The second input-output lookup table 166*b* may store a plurality of second output gray levels corresponding to the plurality of input gray levels. The plurality of second output gray levels may be different from the plurality of first output gray levels. The data controller 163*b* may generate output image data ODAT using the first input-output lookup table 165*b* in a first driving mode, and may generate the output image data ODAT using the second input-output lookup table 166*b* in a second driving mode. In some embodiments, the first driving mode may be, but is not be limited to, a mode in which a driving frequency DF of a display panel 110 is changed within a first variable frequency range (e.g., from about 48 Hz to about 240 Hz). The second driving mode may be, but is not be limited to, a mode in which the driving frequency DF of the display panel 110 is changed within a second variable frequency range different from the first variable frequency range (e.g., from about 48 Hz to about 120 Hz). Accordingly, the input-output lookup table 165*b* and 166*b* may be provided for the specific driving mode of the display device 100 that exists.

Figure 14:
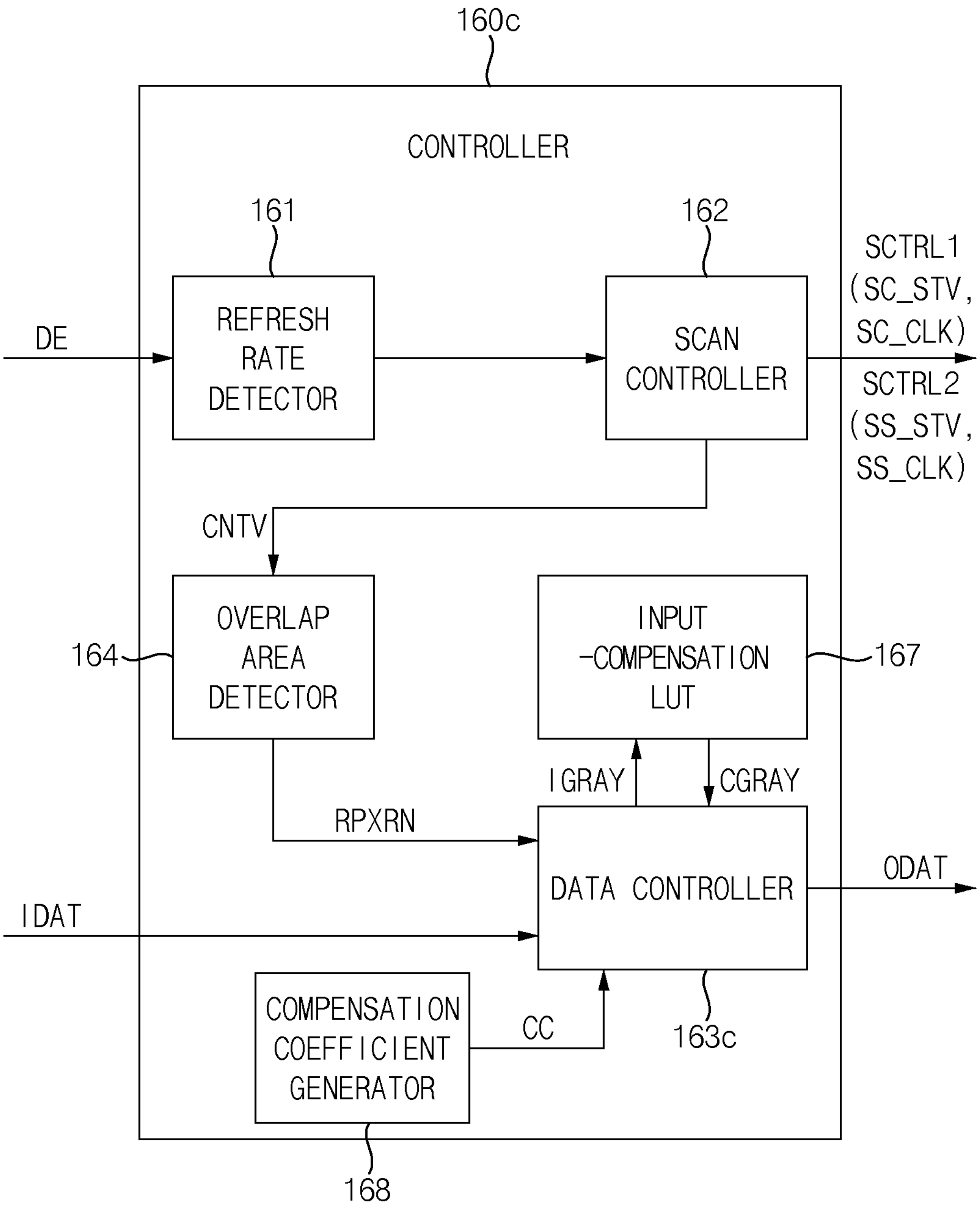
FIG. 14 is a block diagram illustrating a controller included in a display device according to embodiments.
Figure 15:
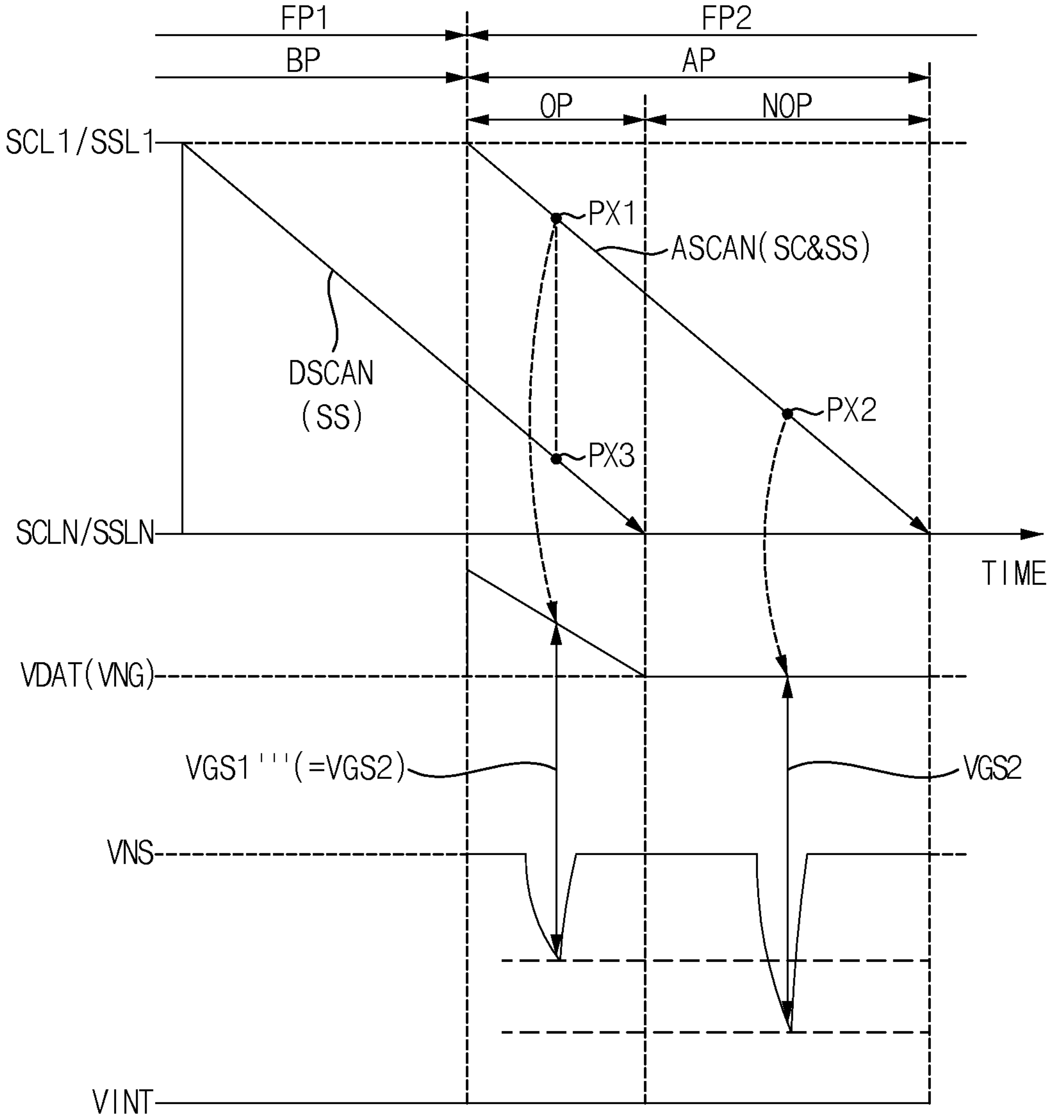
FIG. 15 is a diagram for describing an example where a voltage level of a data voltage is changed in a display device including a controller of FIG. 14.

FIG. 14 is a block diagram illustrating a controller included in a display device according to embodiments, and FIG. 15 is a diagram for describing an example where a voltage level of a data voltage is changed in a display device including a controller of FIG. 14.

Referring to FIGS. 1 and 14, a controller 160*c* of a display device 100 may include a refresh rate detector 161, a scan controller 162, a data controller 163*c*, an overlap are detector 164, an input-compensation lookup table 167 and a compensation coefficient generator 168. The controller 160*c* of FIG. 14 may have a similar configuration and a similar operation to the controller 160*a* of FIG. 10 or the controller 160*b* of FIG. 13, except that the data controller 163*c* may use the input-compensation lookup table 167 and the compensation coefficient generator 168.

The input-compensation lookup table 167 may store a plurality of compensation gray levels corresponding to a plurality of input gray levels. In some embodiments, each compensation gray level may be a gray level that is to be added to a corresponding input gray level. The compensation coefficient generator 168 may generate a compensation coefficient CC that gradually changes (e.g., decreases) in an overlap period. In some embodiments, the compensation coefficient CC may have a value between 0 and 1. Further, the compensation coefficient CC may have an initial value close to 1 as a time length of the overlap period becomes longer, and may gradually decrease to 0 during the overlap period.

With respect to overlapping pixel rows, the data controller 163*c* may obtain a compensation gray level CGRAY corresponding to an input gray level IGRAY represented by input image data IDAT using the input-compensation lookup table 167. The data controller 163*c* may receive the compensation coefficient CC from the compensation coefficient generator 168 and may multiply the compensation gray level CGRAY by the compensation coefficient CC. The data controller 163*c* may calculate an output gray level by adding the compensation gray level CGRAY multiplied by the compensation coefficient CC to the input gray level IGRAY represented by the input image data IDAT, and may generate output image data ODAT representing the calculated output gray level. Accordingly, with respect to the same input gray level IGRAY, the output gray level of the output image data ODAT may gradually decrease. Thus, as illustrated in FIG. 15, with respect to the same input gray level IGRAY, a voltage level of a data voltage VDAT may sharply increase at a start time point of the overlap period OP, and may gradually decrease during the overlap period OP, thereby forming a slanted or ramp-like waveform. Accordingly, a gate-source voltage VGS1''' of a first transistor of the a pixel PX1 receiving the data voltage VDAT in the overlap period OP may be substantially the same as a gate-source voltage VGS2 of a first transistor of a second pixel PX2 receiving the data voltage VDAT in a non-overlap period. This may reduce or eliminate a luminance difference between upper and lower regions of a display panel 110.

Compared with a pixel receiving the data voltage VDAT at an end time of the overlap period OP, a pixel receiving the data voltage VDAT at a start time point of the overlap period OP may be distant from a source (e.g., a power management circuit 140) of an initialization voltage VINT. As a result, the second node NS may not be sufficiently discharged, and a voltage drop through sensing line SL may be relatively large. However, the display device 100 including the controller 160*c* may increase the voltage level of the data voltage VDAT at a high rate at the start time point of the overlap period OP, and then gradually decrease the voltage level of the data voltage VDAT at a slower rate to an original voltage level during the overlap period OP. This may further reduce the luminance difference (or deviation) of the display panel 110.

Figure 16:
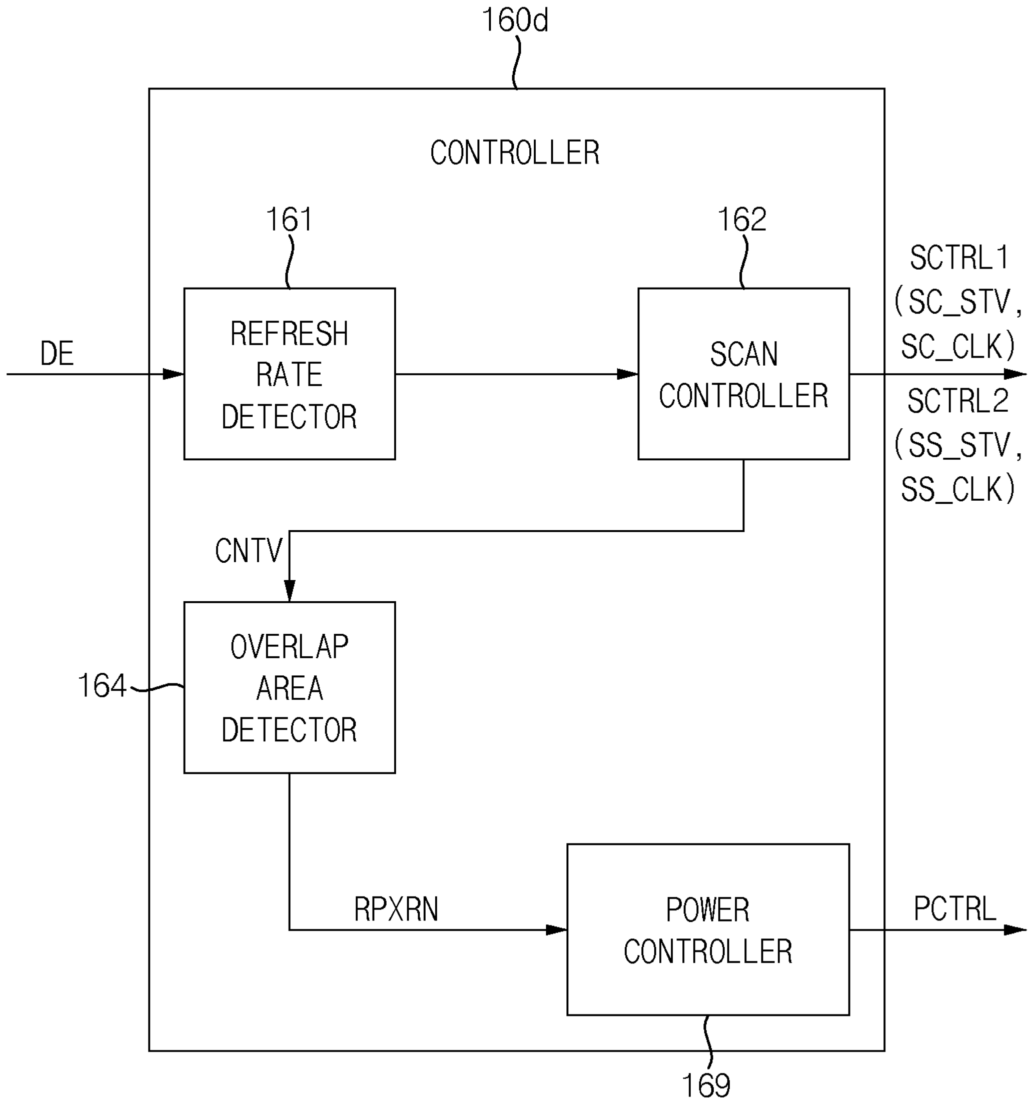
FIG. 16 is a block diagram illustrating a controller included in a display device according to embodiments.
Figure 17:
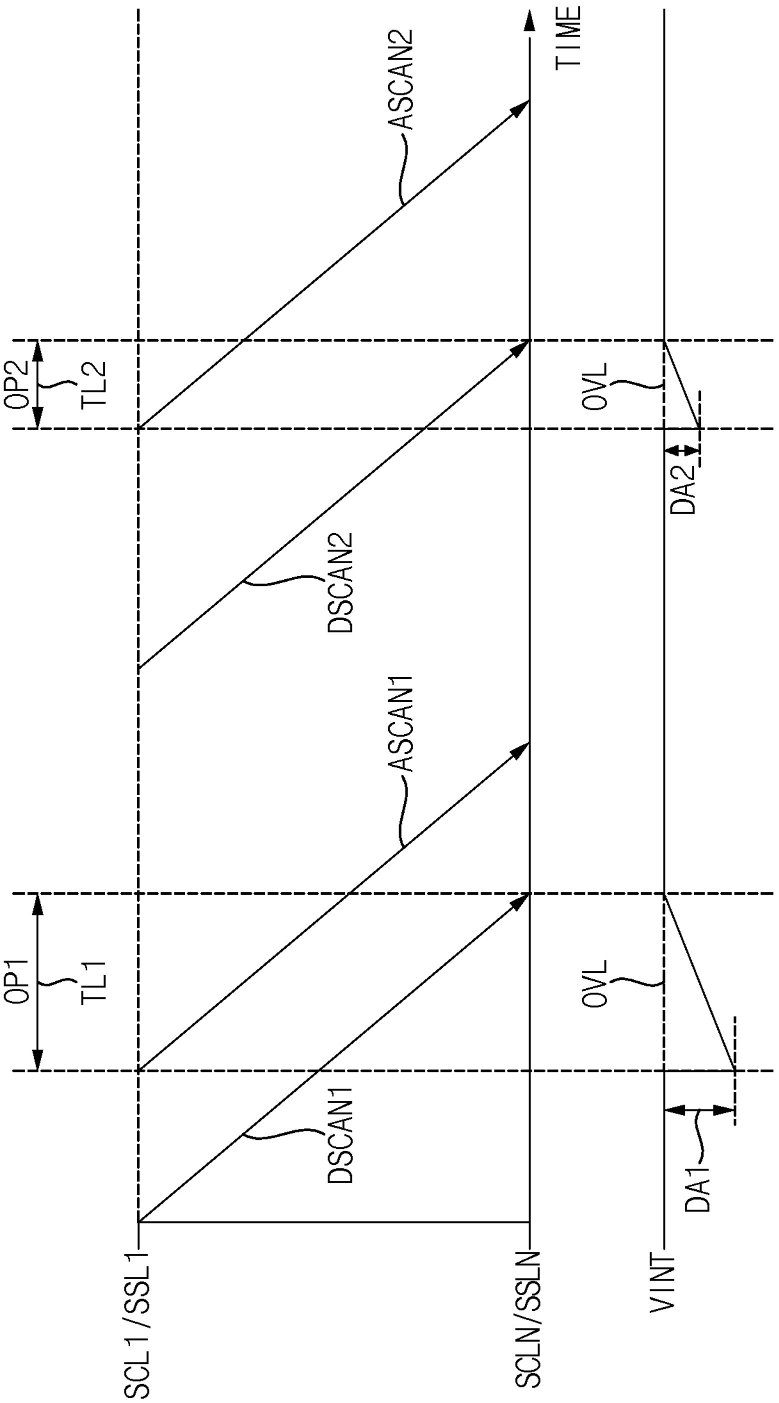
FIG. 17 is a diagram for describing an example where a decrease amount of an initialization voltage is changed according to a time length of an overlap period in a display device including a controller of FIG. 16.

FIG. 16 is a block diagram illustrating a controller included in a display device 160*d* according to embodiments. FIG. 17 is a diagram for describing an example where the amount of decrease of an initialization voltage is changed according to the time length of an overlap period in a display device including a controller of FIG. 16.

Referring to FGIS. 1 and 16, the controller 160*d* of a display device 100 may include a refresh rate detector 161, a scan controller 162, an overlap are detector 164 and a power controller 169. Unlike controller 160*a* of FIG. 10, controller 160*b* of FIG. 13 or controller 160*c* of FIG. 14, the controller 160*d* of FIG. 16 may change a voltage level of an initialization voltage VINT in an overlap period.

The power controller 169 may control a power management circuit 140 to decrease the voltage level of the initialization voltage VINT at a predetermined rate in the overlap period. For example, the power controller 169 may generate a power control signal PCTRL representing a decreased voltage level during the overlap period, having a time length corresponding to the number RPXRN of remaining pixel rows from the overlap area detector 164. The power management circuit 140 may generate the initialization voltage VINT having the decreased voltage level during the overlap period in response to the power control signal PCTRL. In some embodiments, the power controller 169 may control the power management circuit 140 to decrease the voltage level of the initialization voltage VINT by a decrease amount corresponding, for example, to the number RPXRN of remaining pixel rows from an original voltage level at a start time point of the overlap period. The power controller 169 may control the power management circuit 140 to gradually increase the voltage level of the initialization voltage VINT at a predetermined rate to the original voltage level during the overlap period.

For example, as illustrated in FIG. 9, the voltage level of the initialization voltage VINT may decrease at a first predetermined rate at the start time point of the overlap period OP, and may gradually increase to the original voltage level at a second predetermined rate (less than the first predetermined rate) during the overlap period OP. Accordingly, a gate-source voltage VGS1" of a first transistor T1 of a first pixel PX1 (which receives the data voltage VDAT in the overlap period OP) may be substantially the same as a gate-source voltage VGS2 of a first transistor of a second pixel PX2 which receives the data voltage VDAT in a non-overlap period NOP. As a result, the luminance difference between upper and lower regions of a display panel 110 may be eliminated or reduced. Further, since the voltage level of the initialization voltage VINT is lowest at the start time point of the overlap period OP and gradually increases during the overlap period OP, the luminance difference (or deviation) of the display panel 110 may be further reduced.

In some embodiments, the amount by which the voltage level of the initialization voltage VINT decreases at the start time point of the overlap period OP may be determined according to a time length of the overlap period OP. For example, as illustrated in FIG. 17, in a case where a first overlap period OP1 has a first time length TL1, the voltage level of the initialization voltage VINT may be decreased by a first decrease amount DA1 from the original voltage level OVL at a start time point of the first overlap period OP1, and may gradually increase to the original voltage level OVL during the first overlap period OP1. In a case where a second overlap period OP2 has a second time length TL2 different from (e.g., shorter than) the first time length TL1, the voltage level of the initialization voltage VINT may be decreased by a second decrease amount DA2 less than the first decrease amount DA1 from the original voltage level OVL at a start time point of the second overlap period OP2, and may gradually increase to the original voltage level OVL during the second overlap period OP2. Accordingly, an image quality of the display device 100 may be further improved.

Figure 18:
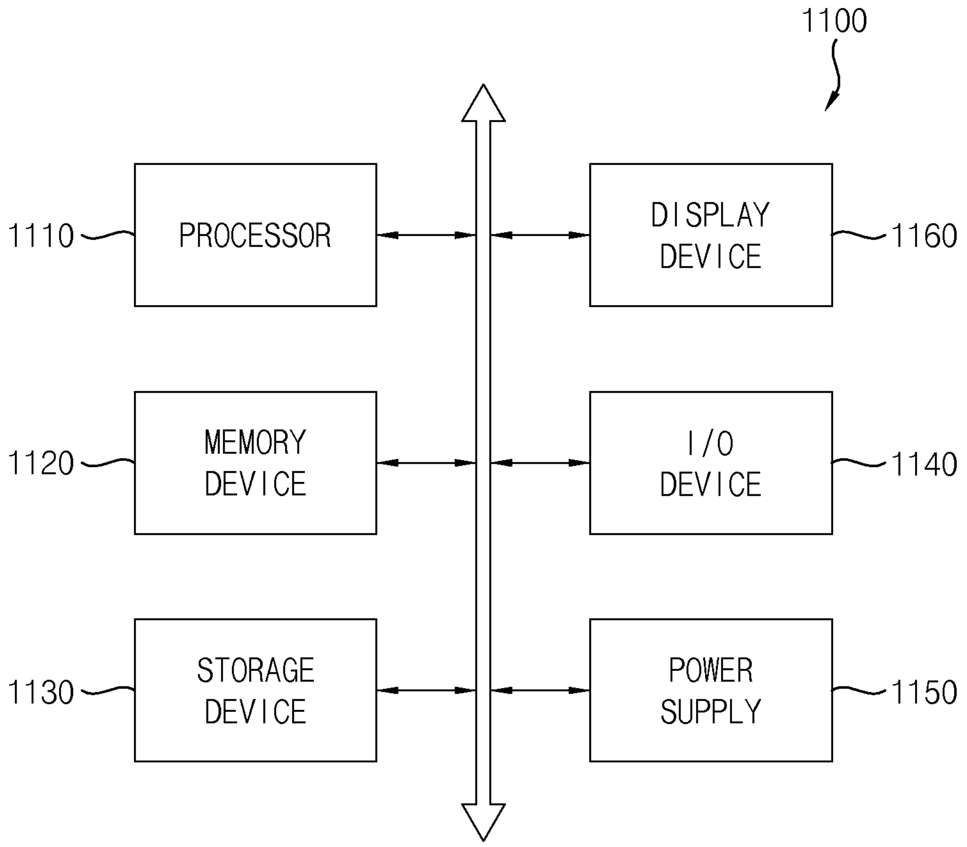
FIG. 18 is a block diagram illustrating an electronic device including a display device according to embodiments.

FIG. 18 is a block diagram illustrating an electronic device 1100 including a display device according to embodiments. Referring to FIG. 18, the electronic device 1100 may include a processor 1110, a memory device 1120, a storage device 1130, an input/output (I/O) device 1140, a power supply 1150, and a display device 1160. The electronic device 1100 may further include a plurality of ports for communicating a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc, and an output device such as a printer, a speaker, etc. The power supply 1150 may supply power for operations of the electronic device 1100. The display device 1160 may be coupled to other components through the buses or other communication links.

In the display device 1160, a voltage level of a data voltage and/or a voltage level of an initialization voltage may be changed in an overlap period, in which a dummy scan operation in a black period of a first frame period and an active scan operation in a second frame period are simultaneously performed as described in connection with the previous embodiments. Thus, a pixel receiving the data voltage in the overlap period and a pixel receiving the data voltage in a non-overlap period after the overlap period may emit light with substantially the same luminance with respect to the same gray level, and a luminance difference (or deviation) between upper and lower regions of a display panel may be eliminated or reduced.

The inventive concepts may be applied to any display device 1160 and any electronic device 1100 including the display device 1160. For example, the inventive concepts may be applied to a smart phone, a wearable electronic device, a tablet computer, a mobile phone, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, etc.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, units, detectors, circuits, generators, drivers, converters, and other signal generating and signal processing features of the embodiments disclosed herein may be implemented, for example, in non-transitory logic that may include hardware, software, or both. When implemented at least partially in hardware, the controllers, processors, devices, units, detectors, circuits, generators, drivers, converters, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, units, detectors, circuits, generators, drivers, converters, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims. The embodiments may be combined to form additional embodiments.

What is claimed is:

1. A display device comprising:

a display panel including pixels;

a data driver configured to provide a data voltage to each of the pixels;

a scan driver configured to provide a first scan signal and a second scan signal to each of the pixels; and a controller configured to control the data driver and the scan driver, wherein the scan driver is further configured to:

perform a first active scan operation that sequentially provides the first scan signal and the second scan signal to the pixels on a row basis in an active period of a first frame period; and initiate a dummy scan operation that sequentially provides the second scan signal to the pixels on a row basis in a blank period of the first frame period, and wherein, in a case where a second frame period starts before the dummy scan operation for the pixel in a last row, the data driver is configured to change a voltage level of the data voltage in an overlap period in which the dummy scan operation and a second active scan operation in the second frame period are simultaneously performed.

2. The display device of claim 1, wherein:

with respect to a same gray level, the voltage level of the data voltage in the overlap period is higher than the voltage level of the data voltage in a non-overlap period, in which only the second active scan operation is performed after the dummy scan operation is completed.

3. The display device of claim 1, wherein:

the display panel is configured to be driven at a driving frequency that varies within a variable frequency range, the scan driver initiates the dummy scan operation after a time corresponding to a blank period of a minimum frame period from a time point at which the first active scan operation is performed, and the minimum frame period corresponds to a maximum frequency of the variable frequency range.

4. The display device of claim 1, wherein each of the pixels includes:

a capacitor including a first electrode connected to a first node and a second electrode connected to a second node;

a first transistor including a gate connected to the first node, a first terminal configured to receive a first power supply voltage, and a second terminal connected to the second node;

a second transistor configured to transfer the data voltage to the first node in response to the first scan signal;

a third transistor configured to transfer an initialization voltage to the second node in response to the second scan signal; and a light emitting element including an anode connected to the second node and a cathode configured to receive a second power supply voltage.

5. The display device of claim 4, wherein:

the pixels include a first pixel configured to receive the data voltage in the overlap period, and a second pixel configured to receive the data voltage in a non-overlap period in which only the second active scan operation is performed after the dummy scan operation is completed, and with respect to a same gray level, the voltage level of the data voltage applied to the first pixel is higher than the voltage level of the data voltage applied to the second pixel, and a voltage difference between the first node and the second node in the first pixel is substantially equal to a voltage difference between the first node and the second node in the second pixel.

6. The display device of claim 1, wherein the controller includes:

a refresh rate detector configured to detect a start time point of the active period and a start time point of the blank period;

a scan controller configured to generate first and second scan control signals for sequentially providing the first and second scan signals to the pixels in the active period, and to generate the second scan control signal for sequentially providing the second scan signal to the pixels in the blank period; and a data controller configured to generate output image data by increasing input image data for overlapping pixel rows that receive the first and second scan signals in the overlap period among all pixel rows of the display panel.

7. The display device of claim 6, wherein:

the scan controller is configured to generate a count value by counting receiving pixel rows that receive the second scan signal by the dummy scan operation until the second frame period starts, the controller further includes:

an overlap area detector configured to calculate a number of remaining pixel rows that are to receive the second scan signal by the dummy scan operation in the overlap period by subtracting a number of the receiving pixel rows from a number of all pixel rows based on the count value, and the data controller is configured to determine the overlapping pixel rows based on the number of the remaining pixel rows and generate the output image data by increasing the input image data for the overlapping pixel rows.

8. The display device of claim 6, wherein:

the controller further includes an input-output lookup table configured to store a plurality of output gray levels corresponding to a plurality of input gray levels, and with respect to the overlapping pixel rows, the data controller is configured to obtain an output gray level corresponding to an input gray level represented by the input image data using the input-output lookup table, and generate the output image data representing the obtained output gray level.

9. The display device of claim 6, wherein:

the controller further includes:

a first input-output lookup table configured to store a plurality of first output gray levels corresponding to a plurality of input gray levels; and a second input-output lookup table configured to store a plurality of second output gray levels corresponding to the plurality of input gray levels and different from the plurality of first output gray levels, and the data controller is configured to generate the output image data using the first input-output lookup table in a first driving mode in which a driving frequency of the display panel is changed within a first variable frequency range, and generate the output image data using the second input-output lookup table in a second driving mode in which the driving frequency of the display panel is changed within a second variable frequency range different from the first variable frequency range.

10. The display device of claim 6, wherein:

the controller further includes:

an input-compensation lookup table configured to store a plurality of compensation gray levels corresponding to a plurality of input gray levels; and a compensation coefficient generator configured to generate a compensation coefficient that gradually decreases in the overlap period, and with respect to the overlapping pixel rows, the data controller is configured to:

obtain a compensation gray level corresponding to an input gray level represented by the input image data using the input-compensation lookup table, multiply the compensation gray level by the compensation coefficient, calculate an output gray level by adding the compensation gray level multiplied by the compensation coefficient to the input gray level represented by the input image data, and generate the output image data representing the calculated output gray level.

11. A display device comprising:

a display panel including pixels;

a data driver configured to provide a data voltage to each of the pixels;

a scan driver configured to provide a first scan signal and a second scan signal to each of the pixels;

a power management circuit configured to provide an initialization voltage to the pixels; and a controller configured to control the data driver, the scan driver and the power management circuit, wherein the scan driver is further configured to:

perform a first active scan operation that sequentially provides the first scan signal and the second scan signal to the pixels on a row basis in an active period of a first frame period; and initiate a dummy scan operation that sequentially provides the second scan signal to the pixels on a row basis in a blank period of the first frame period, and wherein, in a case where a second frame period starts before the dummy scan operation for the pixel in a last row is performed, the power management circuit is configured to change a voltage level of the initialization voltage in an overlap period, in which the dummy scan operation and a second active scan operation in the second frame period are simultaneously performed.

12. The display device of claim 11, wherein the voltage level of the initialization voltage in the overlap period is lower than the voltage level of the initialization voltage in a non-overlap period after the dummy scan operation is completed.

13. The display device of claim 11, wherein the voltage level of the initialization voltage is decreased at a start time point of the overlap period, and is gradually increased to an original voltage level during the overlap period.

14. The display device of claim 11, wherein an amount by which the voltage level of the initialization voltage is decreased at a start time point of the overlap period is determined according to a time length of the overlap period.

15. The display device of claim 14, wherein:

in a case where the overlap period has a first time length, the voltage level of the initialization voltage is decreased by a first decrease amount from an original voltage level at a start time point of the overlap period, and in a case where the overlap period has a second time length shorter than the first time length, the voltage level of the initialization voltage is decreased by a second decrease amount less than the first decrease amount from the original voltage level at the start time point of the overlap period.

16. The display device of claim 11, wherein:

the pixels include a first pixel configured to receive the initialization voltage by the second active scan operation in the overlap period, and a second pixel configured to receive the initialization voltage by the second active scan operation in a non-overlap period after the dummy scan operation is completed, and the voltage level of the initialization voltage applied to the first pixel in the overlap period is lower than the voltage level of the initialization voltage applied to the second pixel in the non-overlap period, and, with respect to a same gray level, a gate-source voltage of a driving transistor of the first pixel is substantially equal to a gate-source voltage of a driving transistor of the second pixel.

17. The display device of claim 11, wherein the controller includes:

a refresh rate detector configured to detect a start time point of the active period and a start time point of the blank period;

a scan controller configured to generate first and second scan control signals for sequentially providing the first and second scan signals to the pixels in the active period, and to generate the second scan control signal for sequentially providing the second scan signal to the pixels in the blank period; and a power controller configured to control the power management circuit to decrease the voltage level of the initialization voltage in the overlap period.

18. The display device of claim 17, wherein:

the scan controller is configured to generate a count value by counting receiving pixel rows that receive the second scan signal by the dummy scan operation until the second frame period starts, the controller further includes an overlap area detector configured to calculate a number of remaining pixel rows that are to receive the second scan signal by the dummy scan operation in the overlap period by subtracting a number of the receiving pixel rows from a number of all pixel rows based on the count value, and the power controller is configured to control the power management circuit to decrease the voltage level of the initialization voltage during the overlap period having a time length corresponding to the number of remaining pixel rows.

19. The display device of claim 18, wherein the power controller is further configured to:

control the power management circuit to decrease the voltage level of the initialization voltage by a decrease amount corresponding to the number of remaining pixel rows from an original voltage level at a start time point of the overlap period; and control the power management circuit to gradually increase the voltage level of the initialization voltage to the original voltage level during the overlap period.

20. A display device comprising:

a display panel including pixels;

a data driver configured to provide a data voltage to each of the pixels;

a scan driver configured to provide a first scan signal and a second scan signal to each of the pixels;

a power management circuit configured to provide an initialization voltage to the pixels; and a controller configured to control the data driver, the scan driver and the power management circuit, wherein, when the first and second scan signals are applied to the pixels in a first row and the second scan signal is applied to the pixels in a second row different from the first row, at least one of a voltage level of the data voltage or a voltage level of the initialization voltage is changed.

21. A display device, comprising:

a scan driver coupled to a display panel;

a data driver coupled to the display panel; and a controller configured to control the scan driver and the data driver to drive the display panel at a driving frequency that is substantially equal to a variable frame rate at which image data is rendered by a host processor wherein:

the controller is configured to control the scan driver to perform an active scan operation during an active period of a first frame period and to control the scan driver to perform one or more dummy scan operations during a blank period of the first frame period, and wherein:

the controller is configured to control the scan driver to perform an active scan operation during a second frame period, the first frame period corresponding to a first frame rate at which the image data is rendered by the host processor, and the second frame period corresponding to a second frame rate at which the image data is rendered by the host processor, the second frame rate greater than the first frame rate.

* * * * *